US012731263B2

(12) United States Patent
Minchenkov et al.

(10) Patent No.: US 12,731,263 B2
(45) Date of Patent: *Sep. 8, 2026

(54) DENTAL OBJECT CLASSIFICATION AND 3D MODEL MODIFICATION

(71) Applicant: Align Technology, Inc., San Jose, CA (US)

(72) Inventors: Mikhail Minchenkov, Zhukovsky (RU); Ran Katz, Hod Hasharon (IL); Pavel Agniashvili, Moscow (RU); Chad Clayton Brown, Cary, NC (US); Jonathan Coslovsky, Rehovot (IL)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,780

(22) Filed: Mar. 14, 2024

(65) Prior Publication Data

US 2024/0221165 A1 Jul. 4, 2024

Related U.S. Application Data

(63) Continuation of application No. 17/580,554, filed on Jan. 20, 2022, now Pat. No. 11,972,572, which is a (Continued)

(51) Int. Cl.

*G06T 7/11* (2017.01)
*A61C 9/00* (2006.01)
(Continued)

(52) U.S. Cl.

CPC .............. *G06T 7/11* (2017.01); *A61C 9/0053* (2013.01); *A61C 13/34* (2013.01); (Continued)

(58) Field of Classification Search

CPC ............. H04L 43/0817; H04L 43/0894; H04L 43/065; H04L 41/0869; H04L 43/0811; (Continued)

(56) References Cited

U.S. PATENT DOCUMENTS

RE49,605 E 8/2023 Kopelman
2024/0423476 A1* 12/2024 Kopelman .............. G06T 7/579

OTHER PUBLICATIONS

Kim RJ, Park JM, Shim JS. Accuracy of 9 intraoral scanners for complete-arch image acquisition: A qualitative and quantitative evaluation. The Journal of Prosthetic Dentistry. Dec. 1, 2018;120(6):895-903.*

(Continued)

*Primary Examiner* — Phu K Nguyen
(74) *Attorney, Agent, or Firm* — Lowenstein Sandler LLP

(57) ABSTRACT

A system includes an intraoral scanner and a computing device. The intraoral scanner generates intraoral scans of a dental site. The computing device processes the intraoral scans using a trained machine learning model to classify points of the intraoral scans into first points having a first dental class and second points having a second dental class; generates a 3D model of the dental site from the intraoral scans; determines first points of the 3D model having the first dental class based on the first points of the intraoral scans and second points of the virtual 3D model having the second dental class based on the second points of the intraoral scans; and removes data for a plurality of the first points of the virtual 3D model having the first dental class to generate a modified virtual 3D model.

21 Claims, 19 Drawing Sheets

Related U.S. Application Data continuation of application No. 16/865,162, filed on May 1, 2020, now Pat. No. 11,238,586.

(60) Provisional application No. 62/933,902, filed on Nov. 11, 2019, provisional application No. 62/868,777, filed on Jun. 28, 2019, provisional application No. 62/842,425, filed on May 2, 2019.

(51) Int. Cl.

| | |
|---|---|
| ***A61C 13/34*** | (2006.01) |
| ***G06F 18/2431*** | (2023.01) |
| ***G06N 3/044*** | (2023.01) |
| ***G06N 3/08*** | (2023.01) |
| ***G06T 7/00*** | (2017.01) |
| ***G06T 17/00*** | (2006.01) |
| ***G06T 19/20*** | (2011.01) |
| ***G06V 10/44*** | (2022.01) |
| ***G06V 10/82*** | (2022.01) |
| ***G06V 20/64*** | (2022.01) |

(52) U.S. Cl.

CPC ......... *G06F 18/2431* (2023.01); *G06N 3/044* (2023.01); *G06N 3/08* (2013.01); *G06T 7/0012* (2013.01); *G06T 17/00* (2013.01); *G06T 19/20* (2013.01); *G06V 10/454* (2022.01); *G06V 10/82* (2022.01); *G06T 2207/10016* (2013.01); *G06T 2207/10024* (2013.01); *G06T 2207/10048* (2013.01); *G06T 2207/20076* (2013.01); *G06T 2207/20081* (2013.01); *G06T 2207/20084* (2013.01); *G06T 2207/20221* (2013.01); *G06T 2207/30036* (2013.01); *G06T 2207/30052* (2013.01); *G06T 2210/41* (2013.01); *G06T 2219/008* (2013.01); *G06T 2219/2021* (2013.01); *G06V 20/653* (2022.01); *G06V 2201/03* (2022.01)

(58) Field of Classification Search

CPC ..... H04L 43/50; H04L 43/0852; G16H 40/67; G16H 290/17; H04W 24/08

USPC .......................................................... 345/418

See application file for complete search history.

(56) References Cited

OTHER PUBLICATIONS

Hack et al, CEREC. "Evaluation of the Accuracy of Six Intraoral Scanning Devices: An in-vitro Investigation." (2015).*

Mizumoto RM, Yilmaz B. Intraoral scan bodies in implant dentistry: A systematic review. The Journal of prosthetic dentistry. Sep. 1, 2018;120(3):343-52.*

Taneva E, Kusnoto B, Evans CA. 3D scanning, imaging, and printing in orthodontics. Issues in contemporary orthodontics. Sep. 3, 2015;148(5):862-7.*

Hassan B, Greven M, Wismeijer D. Integrating 3D facial scanning in a digital workflow to CAD/CAM design and fabricate complete dentures for immediate total mouth rehabilitation. The journal of advanced prosthodontics. Oct. 16, 2017;9(5):381.*

Kumar Y, Janardan R, Larson B, Moon J. Improved segmentation of teeth in dental models. Computer-Aided Design and Applications. Jan. 1, 2011;8(2):211-24.*

Wu K, Chen L, Li J, Zhou Y. Tooth segmentation on dental meshes using morphologic skeleton. Computers & Graphics. Feb. 1, 2014;38:199-211.*

Liao SH, Liu SJ, Zou BJ, Ding X, Liang Y, Huang JH. Automatic tooth segmentation of dental mesh based on harmonic fields. BioMed research international. 2015;2015(1):187173.*

Barone S, Paoli A, Razionale AV. Creation of 3D multi-body orthodontic models by using independent imaging sensors. Sensors. Feb. 5, 2013;13(2):2033-50.*

Isola, et al. "Image-to-image Translation with Conditional Adversarial Networks." arXiv Preprint (2017).

* cited by examiner

330

Receive virtual 3D models of dental arches having labeled dental classes 332

For each virtual 3D model, generate multiple images comprising height maps from virtual 3D model 334

For each image, generate probability map 336

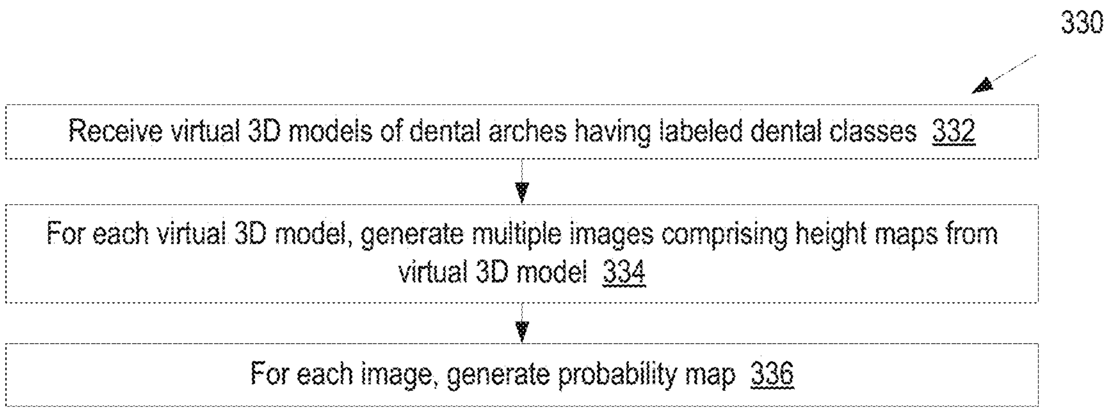

Receive first virtual 3D models of dental arches having excess material 342

Receive corresponding second virtual 3D models of dental arches lacking excess material 344

Compare each first virtual 3D model to corresponding second virtual 3D model 346

Label points on each first virtual 3D model that are not included in the corresponding second virtual 3D model with the first dental class that represents excess material 348

For each first virtual 3D model, generate a plurality of images by projecting the first virtual 3D model onto a plurality of planes 350

For each image, generate probability map 352

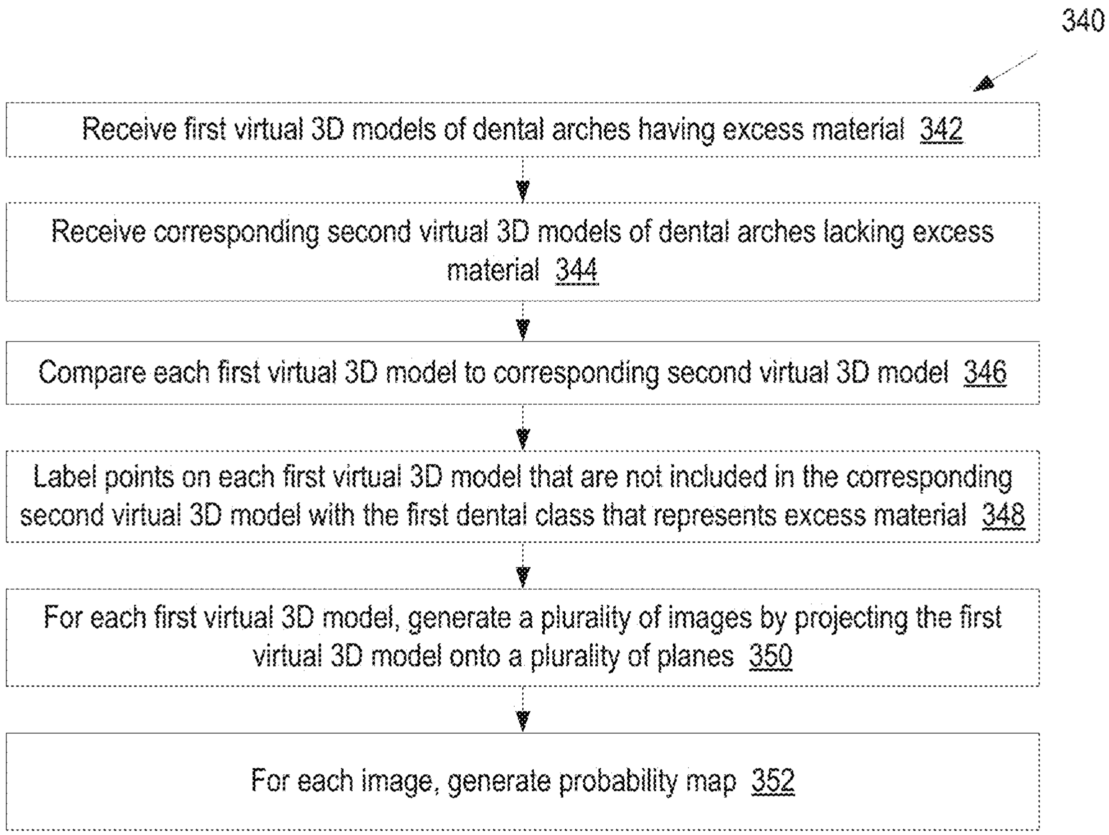

DENTAL OBJECT CLASSIFICATION AND 3D MODEL MODIFICATION

RELATED APPLICATIONS

This patent application is a continuation of U.S. patent application Ser. No. 17/580,554 filed Jan. 20, 2022, which is a continuation of U.S. patent application Ser. No. 16/865,162 filed May 1, 2020, which claims the benefit under 35 U.S.C. § 119(e) of U.S. Provisional Application No. 62/842,425, filed May 2, 2019, of U.S. Provisional Application No. 62/868,777, filed Jun. 28, 2019, and of U.S. Provisional Application No. 62/933,902, filed Nov. 11, 2019, all of which are incorporated by reference herein.

TECHNICAL FIELD

Embodiments of the present disclosure relate to the field of dentistry and, in particular, to the use of machine learning to identify and/or remove excess material from images of dental sites.

BACKGROUND

For both orthodontic and restorative dental work, one or more intraoral scans may be generated of a patient's dental arch using an intraoral scanner. These intraoral scans are then used to generate a virtual three-dimensional (3D) model of the dental arch. The intraoral scans may include information about teeth and gums, and may further include information about other objects that are not material to the orthodontic or restorative dental work, referred to herein as excess material. Inclusion of the excess material in the intraoral scans, and ultimately in the 3D model of the dental arch generated from the 3D scans, can be problematic. The excess material often occludes clinically significant regions, such as teeth and gums.

Once the virtual 3D model is generated, it is generally sent to a lab for processing. Typically, a lab technician then manually removes the excess material from the virtual 3D model (or from a physical 3D model generated from the virtual 3D model). This process is often referred to as modeling, and often includes resculpting the virtual 3D model or physical 3D model. The process of manually modifying the virtual 3D model or physical 3D model is a time intensive task that is performed by experienced lab technicians, which increases the overall cost of the dental prosthetic or orthodontia and increases the amount of time that it takes to manufacture the dental prosthetic or orthodontia.

SUMMARY

In a first aspect of the disclosure, a method includes: receiving an intraoral image of a dental site, the intraoral image comprising a height map; processing an input comprising data from the intraoral image using a trained machine learning model that has been trained to classify regions of dental sites, wherein the trained machine learning model outputs a probability map comprising, for each pixel in the intraoral image, a first probability that the pixel belongs to a first dental class and a second probability that the pixel belongs to a second dental class, wherein the first dental class represents excess material, the excess material comprising material other than teeth or gums; determining, based on the probability map, one or more pixels in the intraoral image that are classified as excess material; and generating a modified intraoral image by removing or hiding from the intraoral image data for the one or more pixels that are classified as excess material.

In a second aspect of the disclosure, a method includes: receiving a plurality of intraoral images of a dental site, wherein each intraoral image of the plurality of intraoral images comprises a height map; processing a plurality of inputs using a trained machine learning model that has been trained to classify regions of dental sites, each of the plurality of inputs comprising data from one of the plurality of intraoral images; wherein for each intraoral image of the plurality of intraoral images, the trained machine learning model outputs a probability map comprising, for each pixel in the intraoral image, a first probability that the pixel belongs to a first dental class and a second probability that the pixel belongs to a second dental class, wherein the first dental class represents excess material, the excess material comprising material other than teeth or gums; and wherein as a result of the processing, a plurality of probability maps are generated, each probability map of the plurality of probability maps being associated with a respective intraoral image of the plurality of intraoral images; generating a three-dimensional model of the dental site from the plurality of intraoral images, wherein each point in the three-dimensional model is associated with one or more first probabilities that the point belongs to the first dental class and one or more second probabilities that the point belongs to the second dental class, wherein the one or more first probabilities and the one or more second probabilities are aggregated from the plurality of probability maps; for each point in the three-dimensional model, determining whether the point is classified as excess material based on at least one of a) the one or more first probabilities or b) the one or more second probabilities; and modifying the three-dimensional model by removing from the three-dimensional model those points that are classified as excess material.

In a third aspect of the disclosure, a method includes: gathering a training dataset, wherein each training data item in the training dataset a) comprises an image comprising a height map of a dental site and b) is associated with a probability map, wherein each pixel in the probability map is assigned a dental class from a plurality of dental classes, wherein a first dental class of the plurality of dental classes represents excess material, the excess material comprising material other than teeth or gums; and training a machine learning model to identify excess material in intraoral images using the training dataset. Training the machine learning model comprises: providing an input to the machine learning model, the input comprising data from an image in a training data item from the training dataset; processing the input by the machine learning model to generate an output, wherein the output comprises a probability map comprising, for each pixel in the image, a first probability that the pixel belongs to the first dental class and a second probability that the pixel belongs to a second dental class of the plurality of dental classes; comparing the output to the probability map associated with the image; determining an error based on differences between the output and the probability map; and adjusting weights of one or more nodes in the machine learning model based on the error.

BRIEF DESCRIPTION OF THE DRAWINGS

Embodiments of the present disclosure are illustrated by way of example, and not by way of limitation, in the figures of the accompanying drawings.

FIG. 3B illustrates a flow diagram for a method of generating a training dataset for training a machine learning model to classify regions of intraoral images, in accordance with an embodiment.

FIG. 3C illustrates a flow diagram for a method of generating a training dataset for training a machine learning model to classify regions of intraoral images, in accordance with an embodiment.

DETAILED DESCRIPTION

Figure 1:
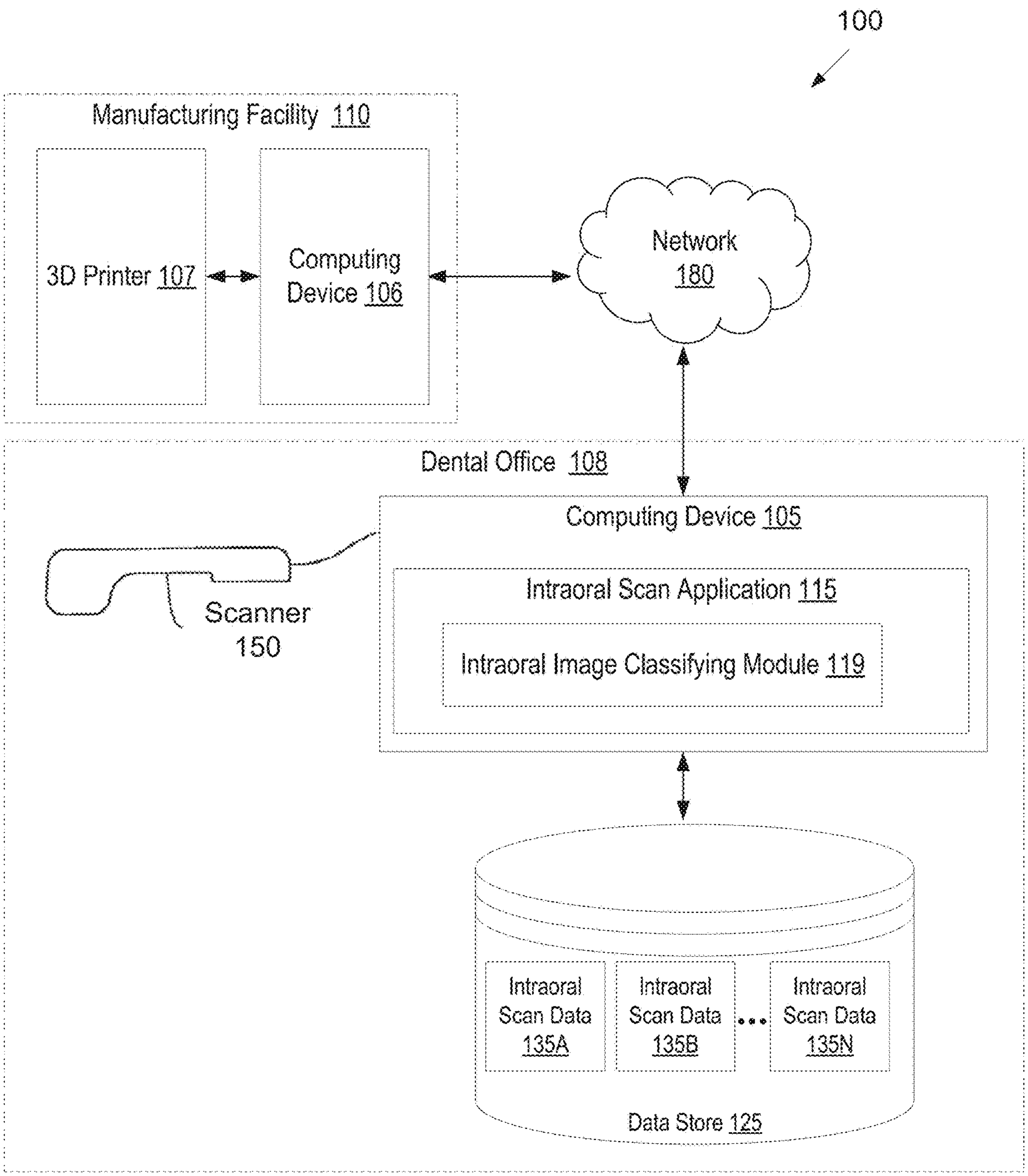
FIG. 1 illustrates one embodiment of a system for performing intraoral scanning and/or generating a virtual three-dimensional model of an intraoral site.

This application describes a set of techniques aimed at solving the problem of excess material removal for intraoral three-dimensional (3D) scanning. Excess material includes various artifacts (tongue, lips, tools and others) that occur during scanning and impede further processing. In some embodiments, excess material includes material other than gums or teeth. Altogether, the techniques described allow a system to significantly improve scanning quality of a dental site and user experience of a user of an intraoral scanner. Additionally, embodiments may reduce the cost of dental prosthetics or orthodontia manufactured based on intraoral scans by increasing the accuracy and quality of those scans, and by reducing an amount of cleanup and/or rework that is performed on 3D models generated from the scans.

In embodiments, some or all of the techniques described herein are performed on intraoral images in real-time or near real time during an intraoral scanning session. Accordingly, an intraoral scan may be generated, and the intraoral scan may subsequently be processed by a trained machine learning model to segment the intraoral image according to two or more dental classes while subsequent scans are being generated (e.g., while subsequent intraoral images are being generated).

Intraoral scanners work by moving a wand (intraoral scanner) inside a patient's mouth to capture all viewpoints of every tooth (or a subset of teeth that are of interest). During scanning, the wand is calculating distances to solid surfaces. These distances are recorded as scans or images called 'height maps'. Each height map is overlapped algorithmically, or 'stitched', with the previous set of height maps to generate a growing 3D model. Two-dimensional (2D) color images may also be generated by the intraoral scanner (referred to as viewfinder images). After scanning, the final virtual 3D model is a set of 3D points and their connections with each other (i.e. a mesh).

In one embodiment, machine learning is used to segment images (e.g., 2D images comprising height maps) into their relevant dental classes. The relevant dental classes may include teeth, gums, and excess material (e.g., material other than teeth or gums). The relevant dental classes may additionally or alternatively include other classes as well, such as an upper palate, a gingival line, a scan body, a finger, or a preparation tooth. Additionally, in some embodiments multiple different types of excess material may be classified (e.g., such as excess material adjacent to teeth and excess material not adjacent to teeth). The images may have been generated from an intraoral scanner or by projecting a virtual 3D model onto a plane.

Various embodiments are described herein. It should be understood that these various embodiments may be implemented as stand-alone solutions and/or may be combined. Accordingly, references to an embodiment, or one embodiment, may refer to the same embodiment and/or to different embodiments.

FIG. 1 illustrates one embodiment of a system 100 for performing intraoral scanning and/or generating a virtual three-dimensional model of an intraoral site. In one embodiment, one or more components of system 100 carries out one or more operations described below with reference to FIGS. 2-12.

System 100 includes a dental office 108 and a manufacturing facility 110. The dental office 108 and the manufacturing facility 110 each include a computing device 105, 106, where the computing devices 105, 106 may be connected to one another via a network 180. The network 180 may be a local area network (LAN), a public wide area network (WAN) (e.g., the Internet), a private WAN (e.g., an intranet), or a combination thereof.

Computing device 105 may be coupled to an intraoral scanner 150 (also referred to as a scanner) and/or a data store 125. Computing device 106 may also be connected to a data store (not shown) and to a 3D printer 107. The data stores may be local data stores and/or remote data stores. Computing device 105 and computing device 106 may each include one or more processing devices, memory, secondary storage, one or more input devices (e.g., such as a keyboard, mouse, tablet, and so on), one or more output devices (e.g., a display, a printer, etc.), and/or other hardware components.

Intraoral scanner 150 may include a probe (e.g., a hand held probe) for optically capturing three-dimensional structures. The intraoral scanner 150 may be used to perform an intraoral scan of a patient's oral cavity. An intraoral scan application 115 running on computing device 105 may communicate with the scanner 150 to effectuate the intraoral scan. A result of the intraoral scan may be intraoral scan data 135A, 135B through 135N that may include one or more sets of intraoral images or scans. Each intraoral image may be a two-dimensional (2D) or 3D image that includes a height map of a portion of a dental site, and may include x, y and z information. In one embodiment, the intraoral scanner 150 generates numerous discrete (i.e., individual) intraoral images. Sets of discrete intraoral images may be merged into a smaller set of blended intraoral images, where each blended image is a combination of multiple discrete images. The scanner 150 may transmit the intraoral scan data 135A, 135B through 135N to the computing device 105. Computing device 105 may store the intraoral scan data 135A-135N in data store 125.

According to an example, a user (e.g., a practitioner) may subject a patient to intraoral scanning. In doing so, the user may apply scanner 150 to one or more patient intraoral locations. The scanning may be divided into one or more segments. As an example, the segments may include a lower buccal region of the patient, a lower lingual region of the patient, a upper buccal region of the patient, an upper lingual region of the patient, one or more preparation teeth of the patient (e.g., teeth of the patient to which a dental device such as a crown or other dental prosthetic will be applied), one or more teeth which are contacts of preparation teeth (e.g., teeth not themselves subject to a dental device but which are located next to one or more such teeth or which interface with one or more such teeth upon mouth closure), and/or patient bite (e.g., scanning performed with closure of the patient's mouth with the scan being directed towards an interface area of the patient's upper and lower teeth). Via such scanner application, the scanner 150 may provide intraoral scan data 135A-N to computing device 105. The intraoral scan data 135A-N may be provided in the form raw scans or blended scans, each of which may be referred to as intraoral images. The intraoral images may each comprise a height map that indicates a depth for each pixel.

When a scan session is complete (e.g., all images for an intraoral site or dental site have been captured), intraoral scan application 115 may generate a virtual 3D model of one or more scanned dental sites. To generate the virtual 3D model, intraoral scan application 115 may register (i.e., "stitch" together) the intraoral images generated from the intraoral scan session. In one embodiment, performing image registration includes capturing 3D data of various points of a surface in multiple images, and registering the images by computing transformations between the images. The 3D data may be in the form of multiple height maps, which may be projected into a 3D space of a 3D model to form a portion of the 3D model. The images may be integrated into a common reference frame by applying appropriate transformations to points of each registered image and projecting each image into the 3D space.

In one embodiment, image registration is performed for adjacent or overlapping intraoral images (e.g., each successive frame of an intraoral video). In one embodiment, image registration is performed using blended images. Image registration algorithms are carried out to register two adjacent intraoral images (e.g., two adjacent blended intraoral images) and/or to register an intraoral image with a 3D model, which essentially involves determination of the transformations which align one image with the other image and/or with the 3D model. Image registration may involve identifying multiple points in each image (e.g., point clouds) of an image pair (or of an image and the 3D model), surface fitting to the points, and using local searches around points to match points of the two images (or of the image and the 3D model). For example, intraoral scan application 115 may match points of one image with the closest points interpolated on the surface of another image, and iteratively minimize the distance between matched points. Other image registration techniques may also be used.

Intraoral scan application may repeat image registration for all images of a sequence of intraoral images to obtain transformations for each image, to register each image with the previous one and/or with a common reference frame (e.g., with the 3D model). Intraoral scan application 115 integrates all images into a single virtual 3D model by applying the appropriate determined transformations to each of the images. Each transformation may include rotations about one to three axes and translations within one to three planes.

Intraoral scan application 115 may generate a 3D model from intraoral images, and may display the 3D model to a user (e.g., a doctor) via a user interface. The 3D model can then be checked visually by the doctor. The doctor can virtually manipulate the 3D model via the user interface with respect to up to six degrees of freedom (i.e., translated and/or rotated with respect to one or more of three mutually orthogonal axes) using suitable user controls (hardware and/or virtual) to enable viewing of the 3D model from any desired direction. The doctor may review (e.g., visually inspect) the generated 3D model of an intraoral site and determine whether the 3D model is acceptable (e.g., whether a margin line of a preparation tooth is accurately represented in the 3D model).

Intraoral scan application 115 may include logic (e.g., intraoral image classifying module 119) for automatically segmenting intraoral images generated by scanner 150 during intraoral scanning. Such logic may perform the operations of the workflows and methods described below with reference to FIGS. 2-3C and 5A-6.

FIGS. 2-3C and 5A-6 illustrate methods related to intraoral scanning and generation and manipulation of virtual 3D models of dental sites. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing an intraoral scan application 115 and/or an intraoral image classifying module 119, such as shown in FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 2:
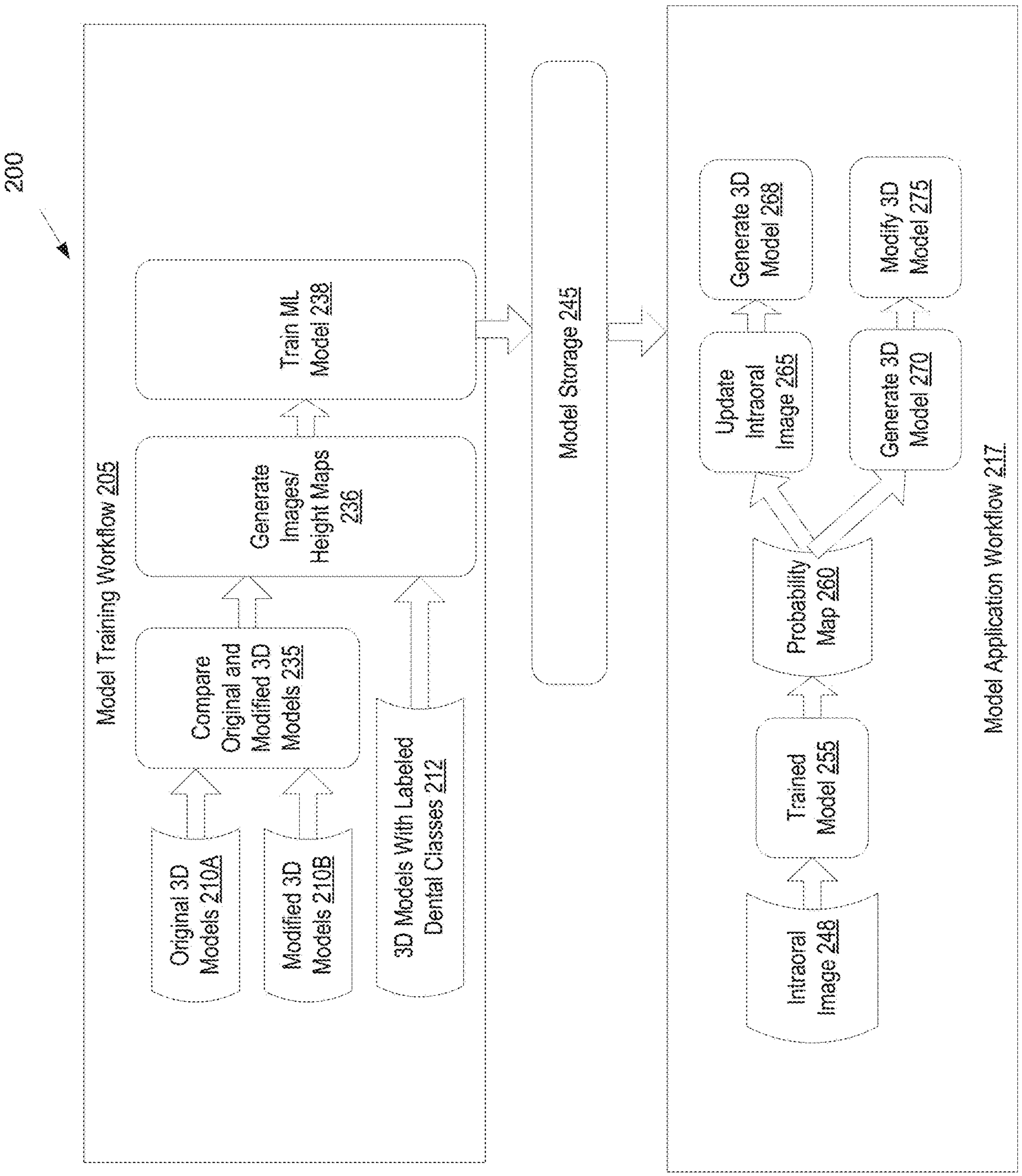
FIG. 2 illustrates an example workflow for generating an accurate virtual 3D model of a dental site and manufacturing a model of a dental arch from the virtual 3D model, in accordance with embodiments of the present disclosure.

FIG. 2 illustrates workflows for training machine learning models and applying the trained machine learning models to images, in accordance with embodiments of the present disclosure. The illustrated workflows include a model training workflow 205 and a model application workflow 217. The model training workflow 205 is to train one or more machine learning models to perform one or more image processing and/or labeling tasks for an image containing teeth. The model application workflow 217 is to apply the one or more trained machine learning models to label one or more dental classes in images of dental sites and/or to modify images of dental sites.

One type of machine learning model that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize that the image contains a face or define a bounding box around teeth in the image. Notably, a deep learning process can learn which features to optimally place in which level on its own. The “deep” in “deep learning” refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, a U-net architecture is used. A U-net is a type of deep neural network that combines an encoder and decoder together, with appropriate concatenations between them, to capture both local and global features. The encoder is a series of convolutional layers that increase the number of channels while reducing the height and width when processing from inputs to outputs, while the decoder increases the height and width and reduces the number of channels. Layers from the encoder with the same image height and width may be concatenated with outputs from the decoder. Any or all of the convolutional layers from encoder and decoder may use traditional or depth-wise separable convolutions.

In one embodiment, the machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future scans and make predictions based on this continuous scanning information. RNNs may be trained using a training dataset to generate a fixed number of outputs (e.g., to classify time varying data such as video data as belonging to a fixed number of classes). One type of RNN that may be used is a long short term memory (LSTM) neural network.

A common architecture for such tasks is LSTM (Long Short Term Memory). Unfortunately, LSTM is not well suited for images since it does not capture spatial information as well as convolutional networks do. For this purpose, one can utilize ConvLSTM—a variant of LSTM containing a convolution operation inside the LSTM cell. ConvLSTM is a variant of LSTM (Long Short-Term Memory) containing a convolution operation inside the LSTM cell. ConvLSTM replaces matrix multiplication with a convolution operation at each gate in the LSTM cell. By doing so, it captures underlying spatial features by convolution operations in multiple-dimensional data. The main difference between ConvLSTM and LSTM is the number of input dimensions. As LSTM input data is one-dimensional, it is not suitable for spatial sequence data such as video, satellite, radar image data set. ConvLSTM is designed for 3-D data as its input. In one embodiment, a CNN-LSTM machine learning model is used. A CNN-LSTM is an integration of a CNN (Convolutional layers) with an LSTM. First, the CNN part of the model processes the data and a one-dimensional result feeds an LSTM model. The network architecture for excess material removal may look as is shown in FIGS. 11A-B in one embodiment, which includes a ConvLSTM machine learning model.

Figure 11A:
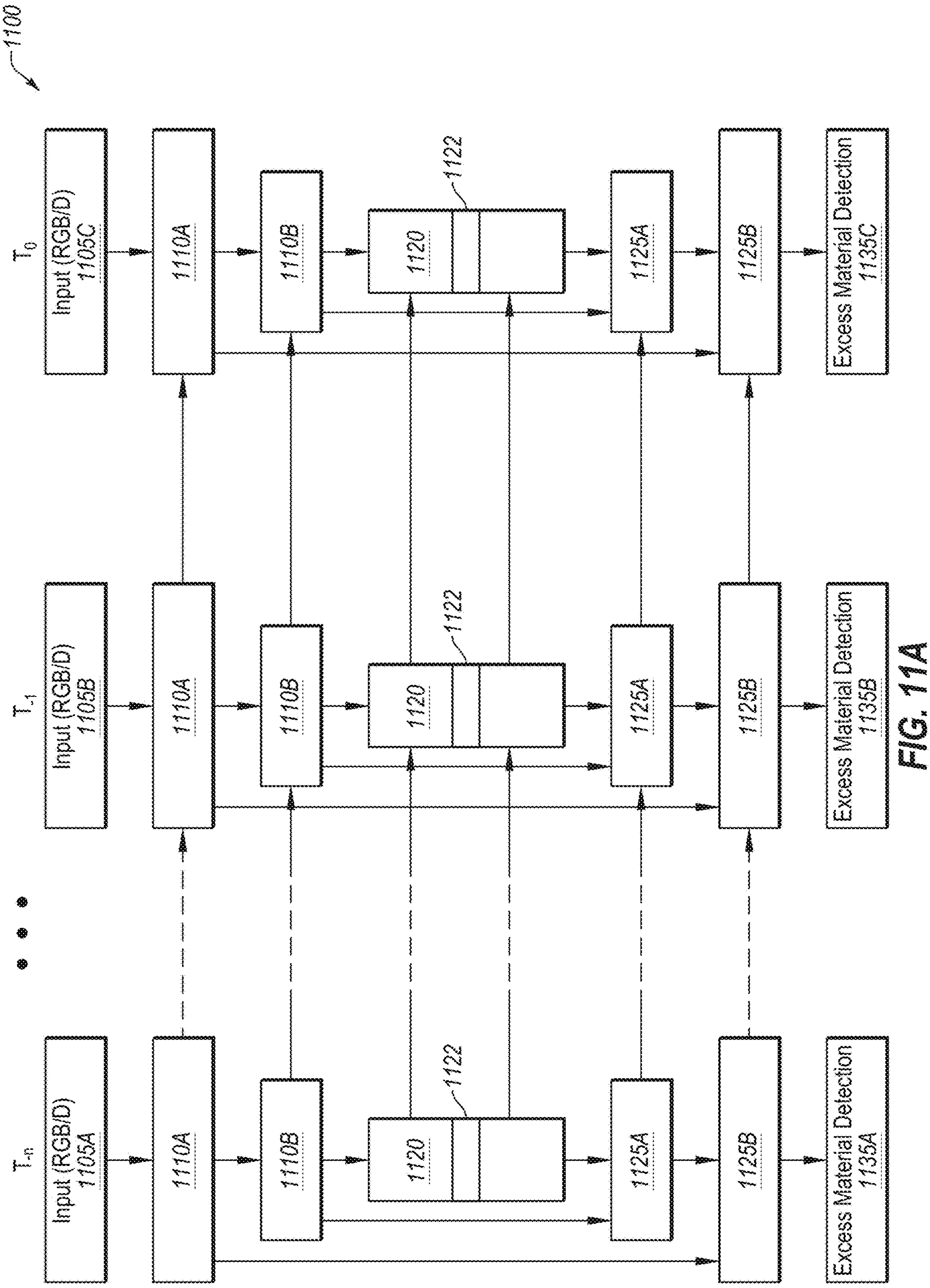
FIGS. 11A-B illustrate an example recurrent neural network architecture that identifies excess material, in accordance with an embodiment.
Figure 11B:
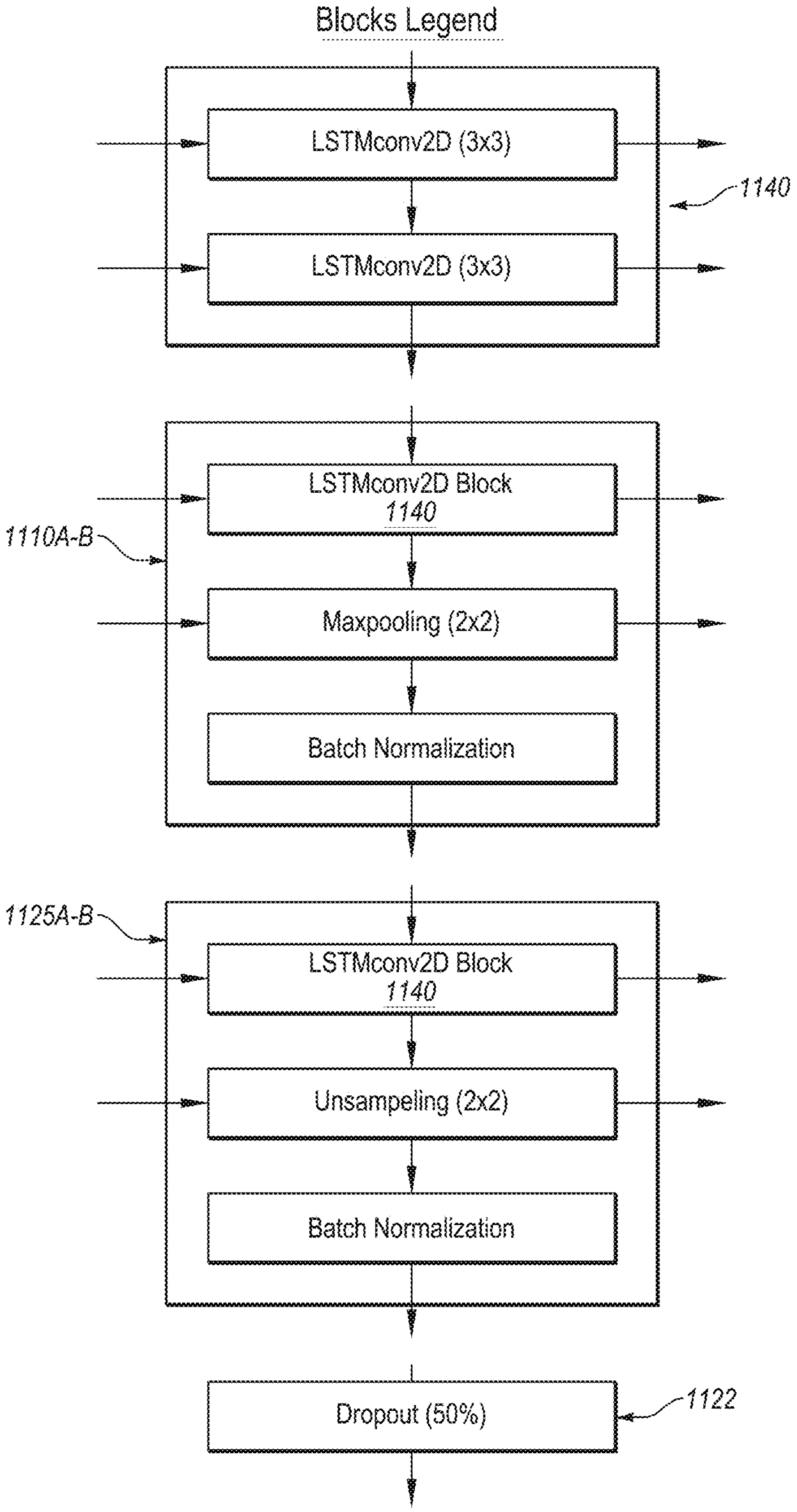
Figure 12A:
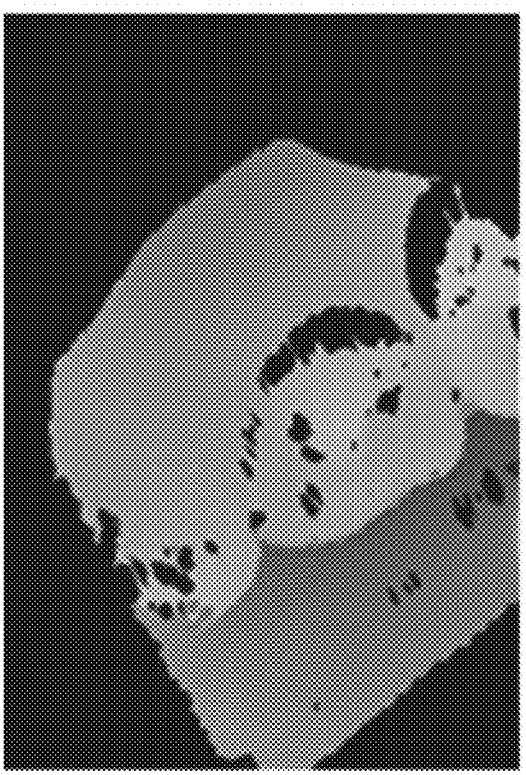
FIGS. 12A-D illustrate four neighboring scans (intraoral images) that may be combined to form an input to a trained machine learning model, in accordance with an embodiment.
Figure 12B:
Figure 12C:
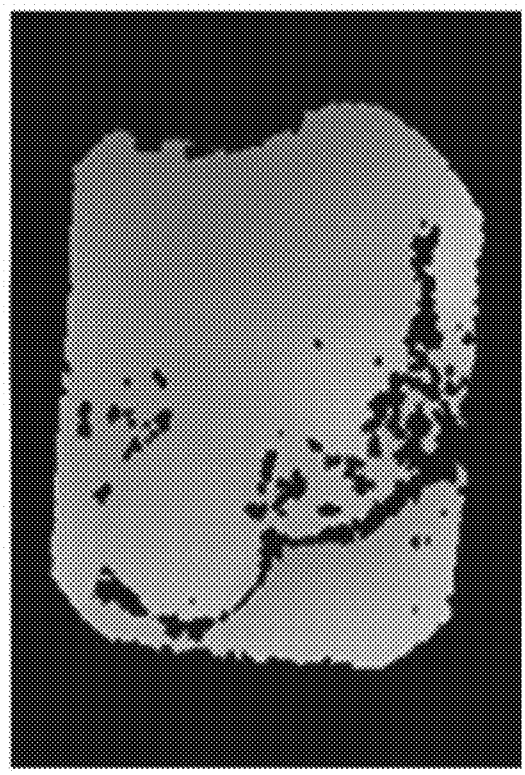
Figure 12D:
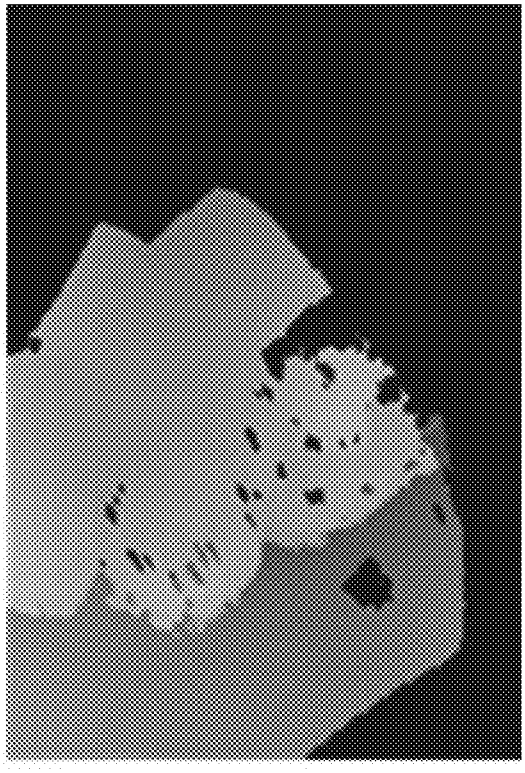

FIGS. 11A-B illustrate an example recurrent neural network architecture for a machine learning model 1100 that identifies excess material, in accordance with an embodiment. The machine learning model 1100 is a u-net encoder-decoder recurrent neural network architecture with a Convulnet (ConvLSTM). In the illustrated recurrent neural network architecture, at time each time t (e.g., $t_n$, $t_1$, $t_0$), where to represents a current time, an input 1105A-C is provided to the machine learning model 1100. The input 1105A-C includes data from an intraoral scan (e.g., a height map of a dental site) and data from an associated color image (e.g., an R layer, a G layer and a B layer).

The data is processed by nodes of a first layer 1110A of the machine learning model, and an output of the nodes of the first layer is processed by nodes of a second layer 1110B of the machine learning model. Nodes of the first layer and second layer may include a ConvLSTM block 1140 as well as a maxpooling 2×2 block and a batch normalization block. The ConvLSTM block may include two LSTMconv2D (3×3) blocks.

Output of the nodes of the second layer are processed by nodes of a third layer 1120, which includes a 50% dropout 1122 (which randomly drops half of the pixels).

Output of the nodes of the second layer and nodes of the third layer are processed by nodes of a fourth layer 1125A. The output of nodes of the first layer and the output of nodes of the fourth layer are processed by nodes of a fifth layer 1125B. Nodes of the fourth layer and fifth layer may include a ConvLSTM block 1140 as well as an upsampling 2×2 block and a batch normalization block.

Output of the nodes of the fifth layer 1125B provides a probability map of dental classes 1135A-C, which can be used to detect excess material.

In one embodiment, a class of machine learning model called a MobileNet is used. A MobileNet is an efficient machine learning model based on a streamlined architecture that uses depth-wise separable convolutions to build light weight deep neural networks. MobileNets may be convolutional neural networks (CNNs) that may perform convolutions in both the spatial and channel domains. A MobileNet may include a stack of separable convolution modules that are composed of depthwise convolution and pointwise convolution (conv 1×1). The separable convolution independently performs convolution in the spatial and channel domains. This factorization of convolution may significantly reduce computational cost from $HWNK^2M$ to $HWNK^2$ (depthwise) plus HWNM (conv 1×1), $HWN(K^2+M)$ in total, where N denotes the number of input channels, $K^2$ denotes the size of convolutional kernel, M denotes the number of output channels, and H×W denotes the spatial size of the output feature map. This may reduce a bottleneck of computational cost to conv 1×1.

In one embodiment, a generative adversarial network (GAN) is used. A GAN is a class of artificial intelligence system that uses two artificial neural networks contesting with each other in a zero-sum game framework. The GAN includes a first artificial neural network that generates candidates and a second artificial neural network that evaluates the generated candidates. The GAN learns to map from a latent space to a particular data distribution of interest (a data distribution of changes to input images that are indistinguishable from photographs to the human eye), while the discriminative network discriminates between instances from a training dataset and candidates produced by the generator. The generative network's training objective is to increase the error rate of the discriminative network (e.g., to fool the discriminator network by producing novel synthesized instances that appear to have come from the training dataset). The generative network and the discriminator network are co-trained, and the generative network learns to generate images that are increasingly more difficult for the discriminative network to distinguish from real images (from the training dataset) while the discriminative network at the same time learns to be better able to distinguish between synthesized images and images from the training dataset. The two networks of the GAN are trained once they reach equilibrium. The GAN may include a generator network that generates artificial intraoral images and a discriminator network that segments the artificial intraoral images. In embodiments, the discriminator network may be a MobileNet.

In one embodiment, the machine learning model is a conditional generative adversarial (cGAN) network, such as pix2pix. These networks not only learn the mapping from input image to output image, but also learn a loss function to train this mapping. GANs are generative models that learn a mapping from random noise vector z to output image y, G: z→y. In contrast, conditional GANs learn a mapping from observed image x and random noise vector z, to y, G: {x, z}→y. The generator G is trained to produce outputs that cannot be distinguished from "real" images by an adversarially trained discriminator, D, which is trained to do as well as possible at detecting the generator's "fakes". The generator may include a U-net or encoder-decoder architecture in embodiments. The discriminator may include a MobileNet architecture in embodiments. An example of a cGAN machine learning architecture that may be used is the pix2pix architecture described in Isola, Phillip, et al. "Image-to-image translation with conditional adversarial networks." arXiv preprint (2017).

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

The model training workflow 205 and the model application workflow 217 may be performed by processing logic executed by a processor of a computing device. These workflows 205, 217 may be implemented, for example, by one or more machine learning modules implemented in intraoral scanning application 115. Additionally FIGS. 3A-3B and 5-6 below describe example operations and/or methods associated with training a machine learning model or applying a trained machine learning model to an input image.

For the model training workflow 205, a training dataset containing hundreds, thousands, tens of thousands, hundreds of thousands or more images should be used to form a training dataset. In embodiments, up to millions of cases of patient dentition that underwent a prosthodontic or orthodontic procedure may be available for forming a training dataset, where each case may include a final virtual 3D model of a dental arch (or other dental site such as a portion of a dental arch) that lacks excess material as well as an initial virtual 3D model of the dental arch (or other dental site) that includes excess material. Cases may additionally or alternatively include virtual 3D models of dental arches (or other dental sites) with labeled dental classes. Each case may include, for example, data showing an initial 3D model of one or more dental sites generated from an intraoral scan, data showing a final 3D model as corrected by lab technicians, data showing whether the doctor accepted the modified 3D model, and so on. This data may be processed to generate a training dataset for training of one or more machine learning models. The machine learning models may be trained to automatically classify and/or segment intraoral scans during or after an intraoral scanning session, and the segmentation/classification may be used to automatically remove excess material from the images. Such trained machine learning models can reduce the amount of post processing that a lab technician spends cleaning up a virtual 3D model, and can improve the accuracy of 3D models of dental arches or other dental sites produced from an intraoral scan.

In one embodiment, a machine learning model 255 is trained to segment intraoral images by classifying regions of those intraoral images into one or more dental classes. A set of many (e.g., thousands to millions) 3D models of dental arches with labeled dental classes 212 may be collected. Alternatively, or additionally, many pairs of original 3D models 210A and modified 3D models 210B may be collected. Each pair of an original 3D model that includes excess material and a corresponding modified 3D model that lacks excess material may be associated with a particular case and/or patient. At block 235, processing logic may compare original 3D models to corresponding modified 3D models to determine differences therebetween. The differences may represent excess material that was removed from the original 3D model by software and/or by a lab technician. Processing logic may automatically label each point on the original 3D model that is not present in the corresponding modified 3D model as excess material. Other points on the modified 3D model and/or original 3D model may additionally include labels (e.g., be labeled as teeth or gums). The labels from the modified 3D models may be transferred to the corresponding original 3D models in embodiments. Accordingly, the original 3D models may be modified to include at a minimum a first label representing excess material and a second label representing non-excess material. In an example, each point in an original 3D models may be modified to include a label having a first value for a first label representing excess material, a second value for a second label representing teeth, and a third value for a third label representing gums. One of the three values may be 1, and the other two values may be 0, for example.

For each 3D model with labeled dental classes, a set of images (e.g., height maps) may be generated at block 236. Each image may be generated by projecting the 3D model (or a portion of the 3D model) onto a 2D surface or plane. Different images of a 3D model may be generated by projecting the 3D model onto different 2D surfaces or planes in some embodiments. For example, a first image of a 3D model may be generated by projecting the 3D model onto a 2D surface that is in a top down point of view, a second image may be generated by projecting the 3D model onto a 2D surface that is in a first side point of view (e.g., a buccal point of view), a third image may be generated by projecting the 3D model onto a 2D surface that is in a second side point of view (e.g., a lingual point of view), and so on. Each image may include a height map that includes a depth value associated with each pixel of the image. For each image, a probability map or mask may be generated based on the labeled dental classes in the 3D model and the 2D surface onto which the 3D model was projected. The probability map or mask may have a size that is equal to a pixel size of the generated image. Each point or pixel in the probability map or mask may include a probability value that indicates a probability that the point represents one or more dental classes. For example, there may be three dental classes, including a first dental class representing excess material, a second dental class representing teeth, and a third dental class representing gums. Points that have a first dental class may have a value of (1, 0, 0) (100% probability of first dental class and 0% probability of second and third dental classes), points that have a second dental class may have a value of (0, 1, 0), and points that have a third dental class may have a value of (0, 0, 1), for example.

A training dataset may be gathered, where each data item in the training dataset may include an image (e.g., an image comprising a height map) and an associated probability map. Additional data may also be included in the training data items. Accuracy of segmentation can be improved by means of additional classes, inputs and multiple views support. Multiple sources of information can be incorporated into model inputs and used jointly for prediction. Multiple dental classes can be predicted concurrently from a single model. Multiple problems can be solved simultaneously: excess material removal, teeth/gums segmentation, stitching conflicts resolution, holes filling, etc. Accuracy is higher than traditional image and signal processing approaches.

Additional data may include a color image. For example, for each image (which may be a monochrome), there may also be a corresponding color image. Each data item may include the height map as well as the color image. Two different types of color images may be available. One type of color image is a viewfinder image, and another type of color image is a scan texture. A scan texture may be a combination or blending of multiple different viewfinder images. Each intraoral scan may be associated with a corresponding viewfinder image generated at about the same time that the intraoral image was generated. If blended scans are used, then each scan texture may be based on a combination of viewfinder images that were associated with the raw scans used to produce a particular blended scan.

The default method may be based on depth info only and still allows distinguishing several dental classes: teeth, gums, excess material (e.g., moving tissues). However, sometimes depth info is not enough for good accuracy. For example, a partially scanned tooth may look like gums or even excess material in monochrome. In such cases color info may help. In one embodiment, color info Is used as an additional 3 layers (e.g., RGB), thus, getting 4 layers input for the network. Two types of color info may be used, which may include viewfinder images and scan textures. Viewfinder images are of better quality but need alignment with respect to height maps. Scan textures are aligned with height maps, but may have color artifacts.

Figure 9B:
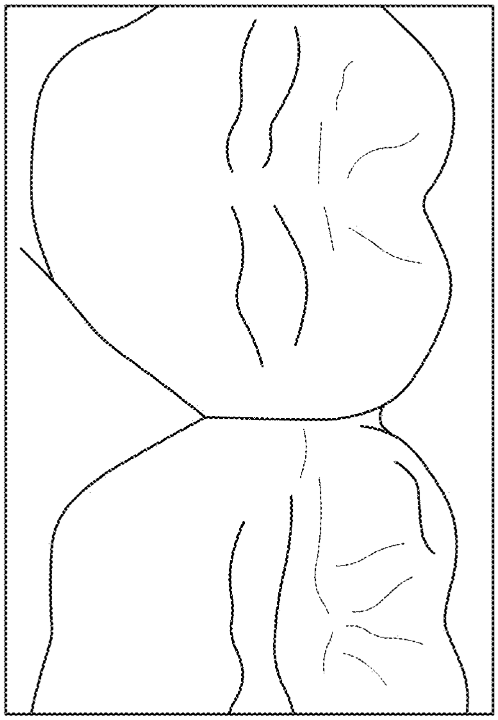
FIG. 9B illustrates an example viewfinder image associated with the example intraoral image of FIG. 9A.
Figure 9A:
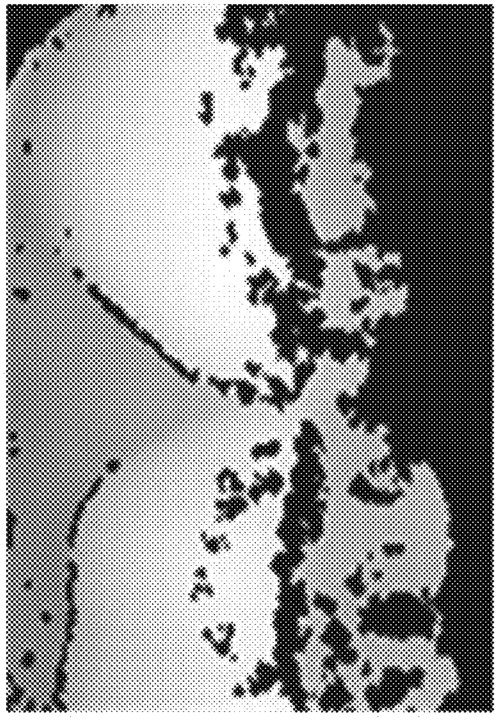
FIG. 9A illustrates an example intraoral image comprising a height map.

FIG. 9A illustrates an example intraoral image comprising a height map.

FIG. 9B illustrates an example viewfinder image associated with the example intraoral image of FIG. 9A.

Figure 9C:
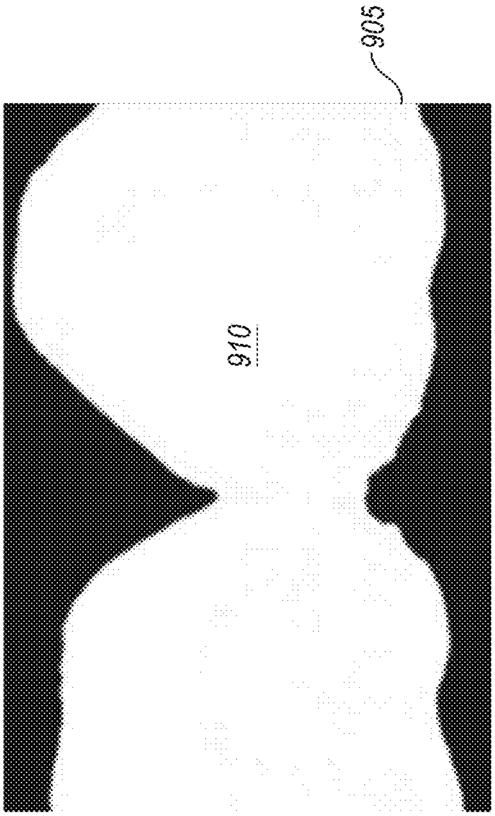
FIG. 9C illustrates a prediction of regions classified as excess material and additional regions not classified as excess material based on the example intraoral image of FIG. 9A and the example viewfinder image of FIG. 9B.

FIG. 9C illustrates a prediction of regions classified as excess material and additional regions not classified as excess material based on the example intraoral image of FIG. 9A and the example viewfinder image of FIG. 9B. The prediction includes predicted teeth 910 and predicted excess material 905. Without use of the viewfinder image of FIG. 9B (e.g., if only the height map of FIG. 9A was used), then the prediction of teeth and excess material may have been incorrect.

Returning to FIG. 2, another type of additional data may include an image generated under specific lighting conditions (e.g., an image generated under ultraviolet or infrared lighting conditions). The additional data may be a 2D or 3D image, and may or may not include a height map.

In some embodiments, sets of data points are associated with the same dental site, and are sequentially labeled. In some embodiments a recurrent neural network is used, and the data points are input into a machine learning model during training in ascending order.

In some embodiments, each image includes two values for each pixel in the image, where the first value represents height (e.g., provides a height map), and where the second value represents intensity. Both the height values and the intensity values may be used to train a machine learning model.

In an example, a confocal intraoral scanner may determine the height of a point on a surface (which is captured by a pixel of an intraoral image) based on a focus setting of the intraoral scanner that resulted in a maximum intensity for that point on the surface. The focus setting provides a height or depth value for the point. Typically the intensity value (referred to as a grade) is discarded. However, the intensity value (grade) associated with the height or depth value may be kept, and may be included in the input data provided to the machine learning model.

At block 238, a machine learning model is trained using the images generated from the 3D models with the labeled dental classes. The machine learning model may be trained to classify pixels in images as belonging to one or more dental classes. The result of this training is a function that can predict dental classes directly from height maps. In particular, the machine learning model may be trained to generate a probability map, where each point in the probability map corresponds to a pixel of an input image and indicates one or more of a first probability that the pixel represents a first dental class, a second probability that the pixel represents a second dental class, a third probability that the pixel represents a third dental class, a fourth probability that the pixels represents a fourth dental class, a fifth probability that the pixel represents a fifth dental class, and so on. In the case of teeth/gums/excess material segmentation, three valued labels are generated.

Further improvement may be achieved by introduction of an additional class of excess material—so called flaps. Flaps may be or include excess material located near teeth. Such excess material should be distinguished from the rest, which is usually on edges of a jaw. Accordingly, in embodiments two different classes of excess material may be identified.

Another class that may be used in embodiments is an upper palate area. This area may be kept and not treated as excess material. One more class that may be used for similar reasons is a gingiva line area. This may also should be kept and not corrupted by the model.

Figure 3A:
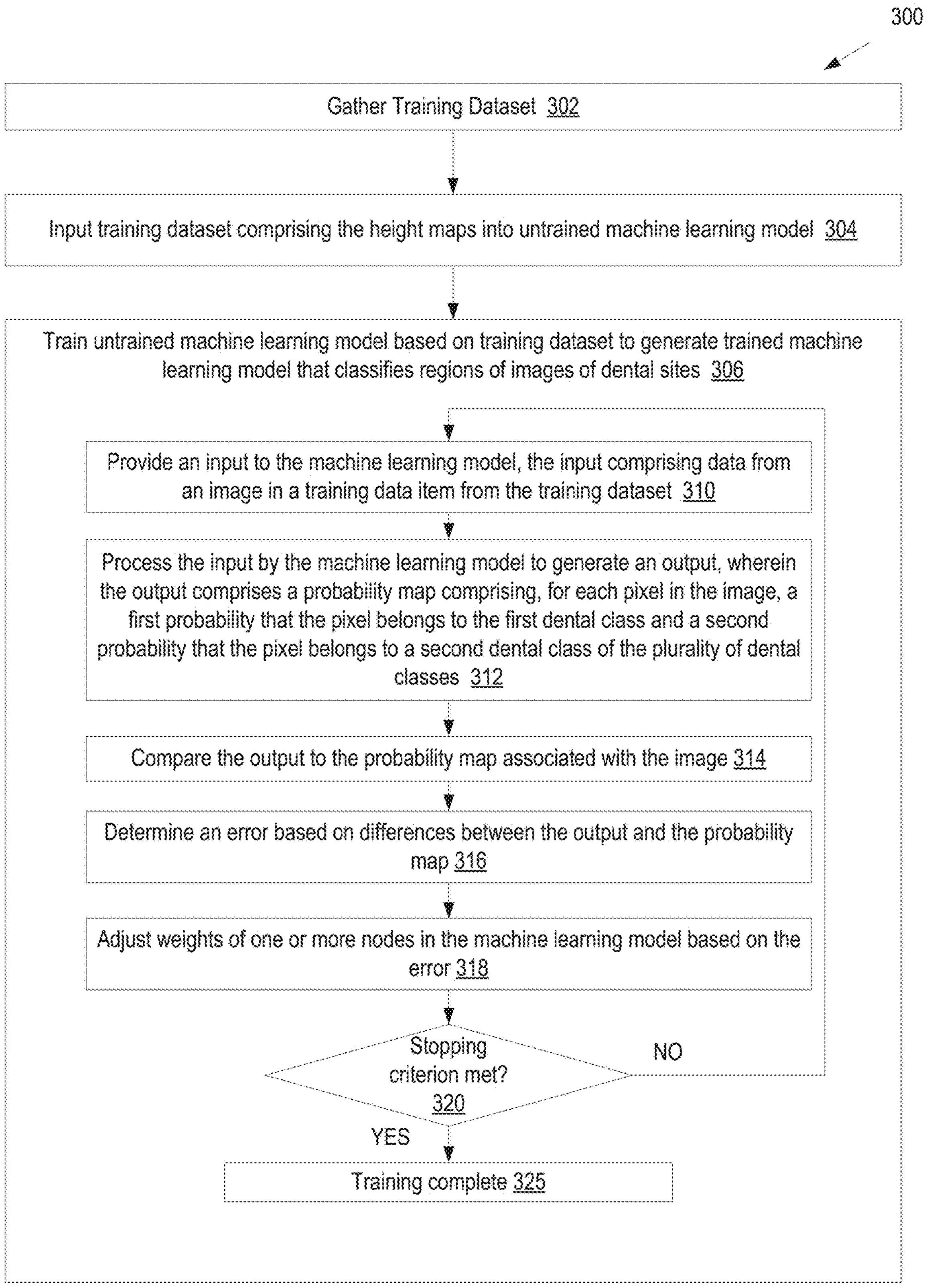
FIG. 3A illustrates a flow diagram for a method of training a machine learning model to classify regions of intraoral images, in accordance with an embodiment.

FIG. 3A illustrates a flow diagram for a method 300 of training a machine learning model to classify regions of intraoral images, in accordance with an embodiment. At block 302 of method 300, processing logic gathers a training dataset comprising images (e.g., height maps) of dental sites (e.g., of dental arches) having labeled dental classes (e.g., in the form of probability maps). One or more images and/or probability maps in the training dataset may be resized. For example, the machine learning model may be usable for images having certain pixel size ranges, and one or more image may be resized if they fall outside of those pixel size ranges. The images may be resized, for example, using methods such as nearest-neighbor interpolation or box sampling. The training dataset may additionally or alternatively be augmented. Training of large-scale neural networks generally uses tens of thousands of images, which are not easy to acquire in many real-world applications. Data augmentation can be used to artificially increase the effective sample size. Common techniques include random rotation, shifts, shear, flips and so on to existing images to increase the sample size.

At block 304, processing logic inputs the training dataset comprising the height maps into an untrained machine learning model. Prior to inputting a first input into the machine learning model, the machine learning model may be initialized. At block 306, processing logic trains the untrained machine learning model based on the training dataset to generate a trained machine learning model that classifies regions of images/height maps of dental sites.

Training may be performed by inputting the images (or data from the images) into the machine learning model one at a time. At block 310, processing logic provides an input to the machine learning model. The input may include data from an image in a training data item from the training dataset. The training data item may include, for example, a height map and an associated probability map, which may be input into the machine learning model. As discussed above, training data items may also include color images, images generated under specific lighting conditions (e.g., UV or IR radiation), and so on. Additionally, pixels of images may include height values or may include both height values and intensity values. The data that is input into the machine learning model may include a single layer (e.g., just height values from a single image) or multiple layers. If multiple layers are used, then one layer may include the height values from the image, and a second layer may include intensity values from the image. Additionally, or alternatively, additional layers may include three layers for color values (e.g., a separate layer for each color channel, such as an R layer, a G layer and a B layer), a layer for pixel information from an image generated under specific lighting conditions, and so on. In some embodiments, data from multiple images is input into the machine learning model together, where the multiple images may all be of the same dental site. For example, a first layer may include height values from a first image of a dental site, a second layer may include height values from a second image of the dental site, a third layer may include height values from a third image of the dental site, and so on. In some embodiments, an RNN is used. In such an embodiment, a second layer may include a previous output of the machine learning model (which resulted from processing a previous input).

At block 312, the machine learning model processes the input to generate an output. An artificial neural network includes an input layer that consists of values in a data point (e.g., intensity values and/or height values of pixels in the image). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class. For the artificial neural network being trained, there may be a first class (excess material), a second class (teeth), a third class (gums), and/or one or more additional dental classes. Moreover, the class is determined for each pixel in the image. For each pixel in the image, the final layer applies a probability that the pixel of the image belongs to the first class, a probability that the pixel belongs to the second class, a probability that the pixel belongs to the third class, and/or one or more additional probabilities that the pixel belongs to other classes.

Accordingly, the output comprises a probability map comprising, for each pixel in the image, a first probability that the pixel belongs to a first dental class (e.g., an excess material dental class) and a second probability that the pixel belongs to a second dental class (e.g., a not excess material dental class). The probability map may include probabilities associated with more than two dental classes in embodiments. For example, in an embodiment, for each pixel in the image, the probability map includes a first probability that the pixel belongs to a first dental class (excess material), a second probability that the pixel belongs to a second dental class (e.g., teeth) and a third probability that the pixel belongs to a third dental class (e.g., gums). In such an example, the excess material may include any material other than teeth or gums. In further embodiments, other dental classes may also be identified for pixels in the output. For example, the probability map may include probabilities of pixels belonging to dental classes representing an upper palate, a gingival line, a scan body, a finger, or a preparation tooth. In further embodiments, different dental classes may represent different types of excess material. For example, a first dental class may represent excess material near or adjacent to teeth, a second dental class may represent excess material not adjacent to teeth, and one or more other dental classes may represent other dental objects.

At block 314, processing logic may then compare the generated probability map to the known probability map that was included in the training data item. At block 316, processing logic determines an error (i.e., a classification error) based on the differences between the output probability map and the provided probability map. At block 318, processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

The errors of the network may not be symmetrical across dental classes. In embodiments it may be acceptable to have part of a patient's gum treated as excess material, but it is unacceptable to treat teeth as excess material—this would result into a hole on a tooth. Thus, in one embodiment processing logic penalizes the model for misclassification differently for different class pairs. This is done by means of a loss function and increases the accuracy of the segmentation.

In the case that multiple different classes of excess material are used (e.g., regular excess material and flaps), different penalties may be applied for errors associated with regular excess material (excess material not adjacent to teeth) and errors associated with flaps (excess material located near teeth). The penalty for flaps misclassified may be the highest penalty.

In one embodiment, misclassification of gums as excess material (e.g., an area where gums turn into lips on the edges of the jaw) may be penalized less than other types of misclassifications. The model may make a smooth transition from gums to excess material in such areas in embodiments, and the aggressiveness of the cleaning may be controlled by means of thresholds, as discussed above.

Once the model parameters have been optimized, model validation may be performed to determine whether the model has improved and to determine a current accuracy of the deep learning model. At block 320, processing logic determines whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, then the method returns to block 310 and another input is provided to the machine learning model. This process may be performed repeatedly using a large portion of the training dataset, with each iteration slightly refining the accuracy of the machine learning model.

If the stopping criterion has been met, the method proceeds to block 325, at which training may be complete. Once the machine learning model is trained, a reserved portion of the training dataset may be used to test the model.

FIG. 3B illustrates a flow diagram for a method 330 of generating a training dataset for training a machine learning model to classify regions of intraoral images, in accordance with an embodiment. At block 332, processing logic receives multiple virtual 3D models of dental arches (or other dental sites) having labeled dental classes.

Figure 4A:
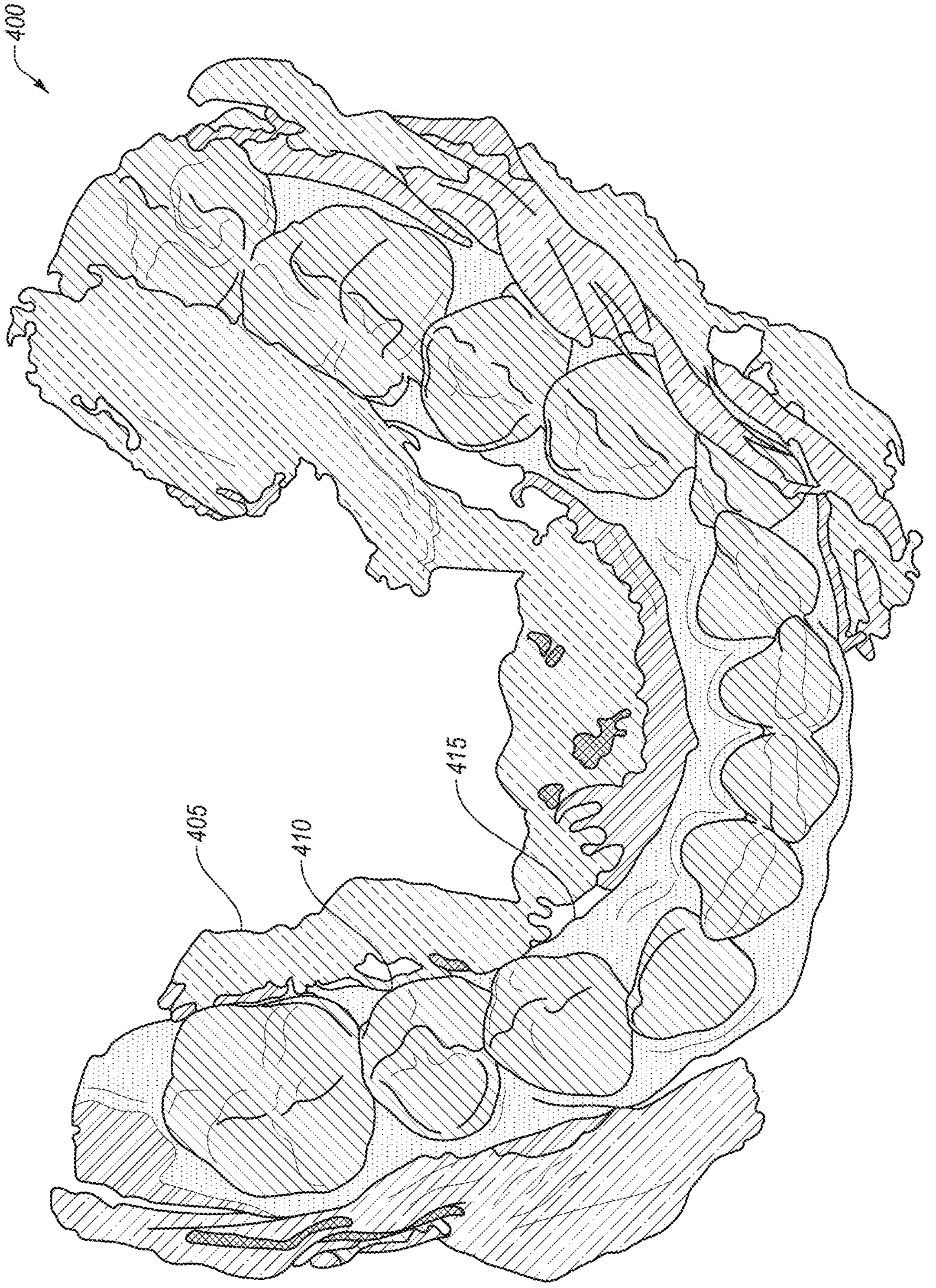
FIG. 4A illustrates an example virtual 3D model of a dental arch, including excess material, in accordance with an embodiment.

FIG. 4A illustrates an example virtual 3D model of a dental arch, including excess material, in accordance with an embodiment. As shown, the virtual 3D model includes labeled dental classes, including labeled excess material 405, labeled teeth 410 and labeled gums 415.

Returning to FIG. 3B, at block 334, for each virtual 3D model processing logic generates one or multiple images comprising height maps from the virtual 3D model. Each image may be generated by projecting the 3D model onto a 2D surface or plane, as described above. In one embodiment, about 10-150 greyscale height maps are generated for each case or patient. At block 336, processing logic generates probability map for each image. The probability map may be generated by associating dental classification labels from the virtual 3D model to the corresponding pixels in the image.

Figure 4C:
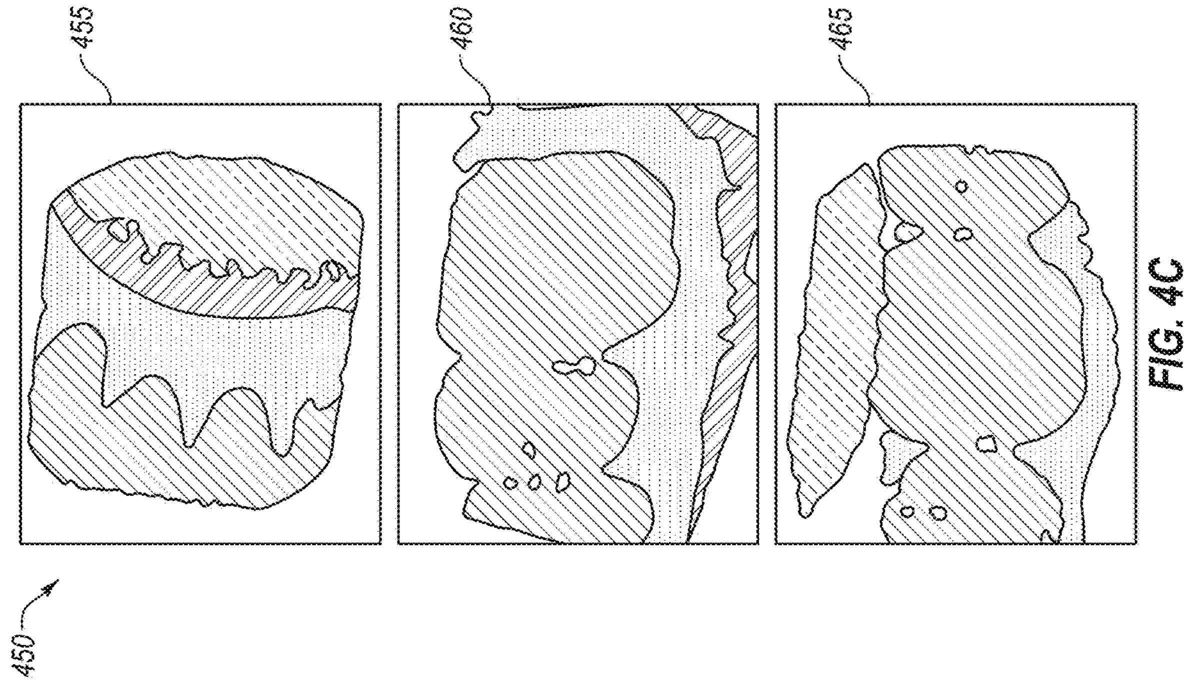
FIG. 4C illustrates a set of example probability maps associated with the set of images shown in FIG. 4B, in accordance with an embodiment.
Figure 4B:
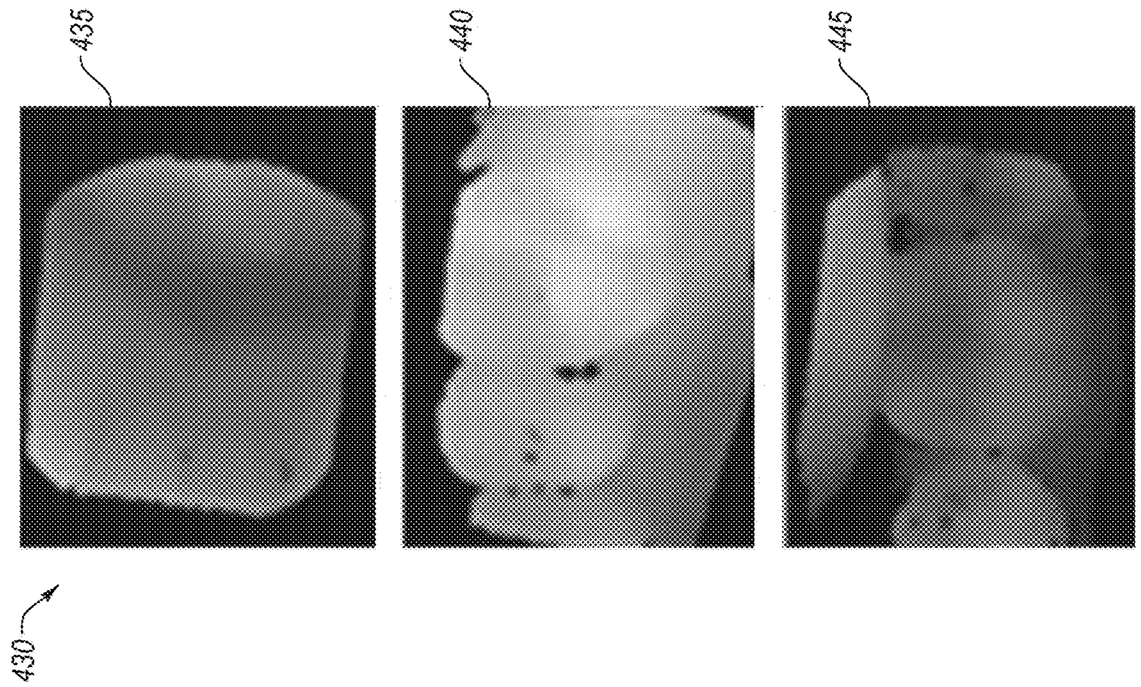
FIG. 4B illustrates a set of example images of a dental site, in accordance with an embodiment.

FIG. 4B illustrates a set of example images 435, 440, 445 of a dental site generated by projecting the virtual 3D model of FIG. 4A onto multiple different planes or 2D surfaces, in accordance with an embodiment. FIG. 4C illustrates a set of example probability maps 455, 460, 465 associated with the set of images 435, 440, 445 shown in FIG. 4B, in accordance with an embodiment. Probability map 455 is associated with image 435, probability map 460 is associated with image 440, and probability map 465 is associated with image 445. Each image may include an associated mask or probability map that indicates dental classes associated with pixels in the image.

FIG. 3C illustrates a flow diagram for a method 340 of generating a training dataset for training a machine learning model to classify regions of intraoral images, in accordance with an embodiment. At block 342 of method 340, processing logic receives original virtual 3D models of dental arches with excess material. An example 3D model with excess material is shown in FIG. 4A. At block 344, processing logic receives associated corrected virtual 3D models in which the excess material has been removed. An example corrected 3D model is shown in FIG. 7C. The corrected 3D models may include additional information that may indicate dental classifications of remaining surfaces, such as dental classifications of teeth and gums. The corrected 3D models may have been generated by performing model cleanup of periphery soft tissues, removal of artifacts (e.g., caused by blood, saliva, obstructing objects such as cotton rolls or retraction cord, etc.), and so on.

At block 346, processing logic compares each original (or first) virtual 3D model to a corresponding corrected (or second) virtual 3D model. At block 348, processing logic labels points on each original (or first) virtual 3D model that are not included in the corresponding corrected (or second) virtual 3D model with the first dental class that represents excess material. Additionally, if the corrected virtual 3D model includes labeled pixels, then the labels from the corrected virtual 3D model may be added to the corresponding original virtual 3D model.

At block 350, for each original virtual 3D model, processing logic generates a plurality of images by projecting the original virtual 3D model onto a plurality of planes or 2D surfaces, as discussed with reference to FIG. 3B. At block 352, for each image processing logic generates a probability map.

Returning back to FIG. 2, once the machine learning model is trained, that trained machine learning model is stored in model storage 245. Model storage 245 may include storage of one or more machine learning models in a permanent storage, such as a storage server, which may include solid state storage devices, hard disk drives, tape back drives, and so on.

The model application workflow 217 begins with receipt and/or generation of an intraoral image of a dental site (e.g., of a portion of a dental arch). In one embodiment, the intraoral image is intraoral scan data generated by an intraoral scanner. For example, a doctor may perform an intraoral scan of a patient using scanner 150, and an intraoral image may be generated from the intraoral scan. In one embodiment, multiple individual intraoral images generated sequentially during the intraoral scan are combined to form a blended image. In such an embodiment, the received intraoral image 248 is a blended image.

Additionally, other types of images may also be generated, such as a color image, an image taken under particular lighting conditions, and so on.

The intraoral image 248 (and optionally other data) is input into trained model 255, which may have been trained as set forth above.

The trained machine learning model 255 outputs a probability map 260, where each point in the probability map corresponds to a pixel in the image and indicates probabilities that the pixel represents one or more dental classes. In the case of teeth/gums/excess material segmentation, three valued labels are generated for each pixel. The corresponding predictions have a probability nature: for each pixel there are three numbers that sum up to 1.0 and can be interpreted as probabilities of the pixel to correspond to these three classes.

In case of three classes, it is convenient to store such predictions of dental classes in an RGB format. For example, a first value for a first dental class may be stored as a red intensity value, a second value for a second dental class may be stored as a green intensity value, and a third value for a third dental class may be stored as a blue intensity value. This may make visualization of the probability map very easy. Usually, there is no need in high precision and chars can be used instead of floats—that is 256 possible values for every channel of the pixel. Further optimization can be done in order to reduce the size and improve performance (e.g., use 16 values quantization instead of 256 values).

In one embodiment, at block 265 the probability map is used to update the intraoral image to generate a modified intraoral image. The probability map may be used to determine pixels that represent excess material. Data for pixels labeled as excess material may then be removed from or hidden in the intraoral image. This may include actually removing the pixels labeled as excess material from the intraoral image, applying a filter to the intraoral image, or modifying the pixels of the intraoral image labeled as excess material to a value that indicates that there is no surface at the pixel (e.g., reducing a height map value for the pixel to zero or another predefined value). At block 268, processing logic generates a virtual 3D model of the dental arch (or other dental site) from the intraoral image and/or from one or more other intraoral images that have also been processed by the trained machine learning model 255. The images that are used to generate the virtual 3D model may be modified images in which excess material has been removed, filtered or hidden (collectively referred to as removal).

In one embodiment, at block 270 processing logic generates a virtual 3D model from the intraoral image and/or from one or more other intraoral images that have also been processed by the trained machine learning model. The probability map 260 is projected onto the 3D model to update the 3D model with dental classification information. Additionally, the probability maps of other processed intraoral images may also be projected onto the points in the virtual 3D model. Accordingly, each point in the virtual 3D model may include probability information from probability maps of multiple different intraoral images that map to that point. In one embodiment, the probability information from the probability map is projected onto the 3D model as a texture. The updated 3D model may then include, for one or more points, vertexes or voxels of the 3D model (e.g., vertexes on a 3D mesh that represents the surface of the 3D model), multiple sets of probabilities, where different sets of probabilities may have different probability values.

At block 275, processing logic may then modify the virtual 3D model by determining, for each point in the virtual 3D model, the dental class for that point. This may include using a voting function to determine a dental class for each point. For example, each set of probability values from an intraoral image may indicate a particular dental class. Processing logic may determine the number of votes for each dental class for a point, and may then classify the point as having a dental class that receives the most votes.

Those points classified as excess material may then be removed in the modified virtual 3D model.

As indicated at blocks 265 and 275, given a probability map that includes probabilities of pixels belonging to various dental classes, where at least one of those dental classes is an excess material dental class, the system can filter out pixels that correspond to excess material. This can be done in multiple ways.

In a first technique for applying the probability map, processing logic determines whether the probability of a pixel being excess material is larger than the probabilities of the pixel being anything else (e.g., larger than the probability of the pixel being gums or teeth. A pixel is then determined to be in the excess material class (e.g., represented as a blue component) if it has greater value than other dental classes (e.g., tooth and gum dental classes represented as red and green components, respectively). That is the simplest approach that operates directly on height maps of intraoral images, and may be performed in scan time (e.g., in real time or near real time as scans are generated). This technique may be performed at block 265, for example.

In a second technique for applying the probability map, processing logic determines whether the probability of a pixel being excess material exceeds a threshold probability. If the probability of the excess material class (e.g., represented as a blue component) has a value that is greater than some probability threshold, then the pixel is classified as excess material. That is another scan time approach, and has increased flexibility. The probability threshold can be adjusted so that too much area is not identified as excess material and removed. This technique may be performed at block 265, for example.

In a third technique for applying the probability map, it is used to adjust a virtual 3D model rather than images used to form the virtual 3D model. For this technique, as expressed in block 275, processing logic combines 2D predictions on height maps into predictions on a 3D surface of the virtual 3D model, and filters points on the surface rather than on individual height maps. This approach may not be applied directly in scan time in some embodiments since it can require all scans of the surface. However, in some embodiments, incremental merging of 2D height map predictions into an already formed 3D surface prediction is performed. In this embodiment, the 3D model may be generated and updated dynamically as new intraoral images are generated and processed by the trained machine learning model 255. This approach may combine the advantage of filtering out excess material during an intraoral scan (e.g., in real time or near real time), and also leverages the advantage of the voting power of multiple predictions. If there are some bad predictions they will be absorbed by the multiple good predictions. This approach is especially good at teeth/gums segmentation in embodiments.

Figure 5A:
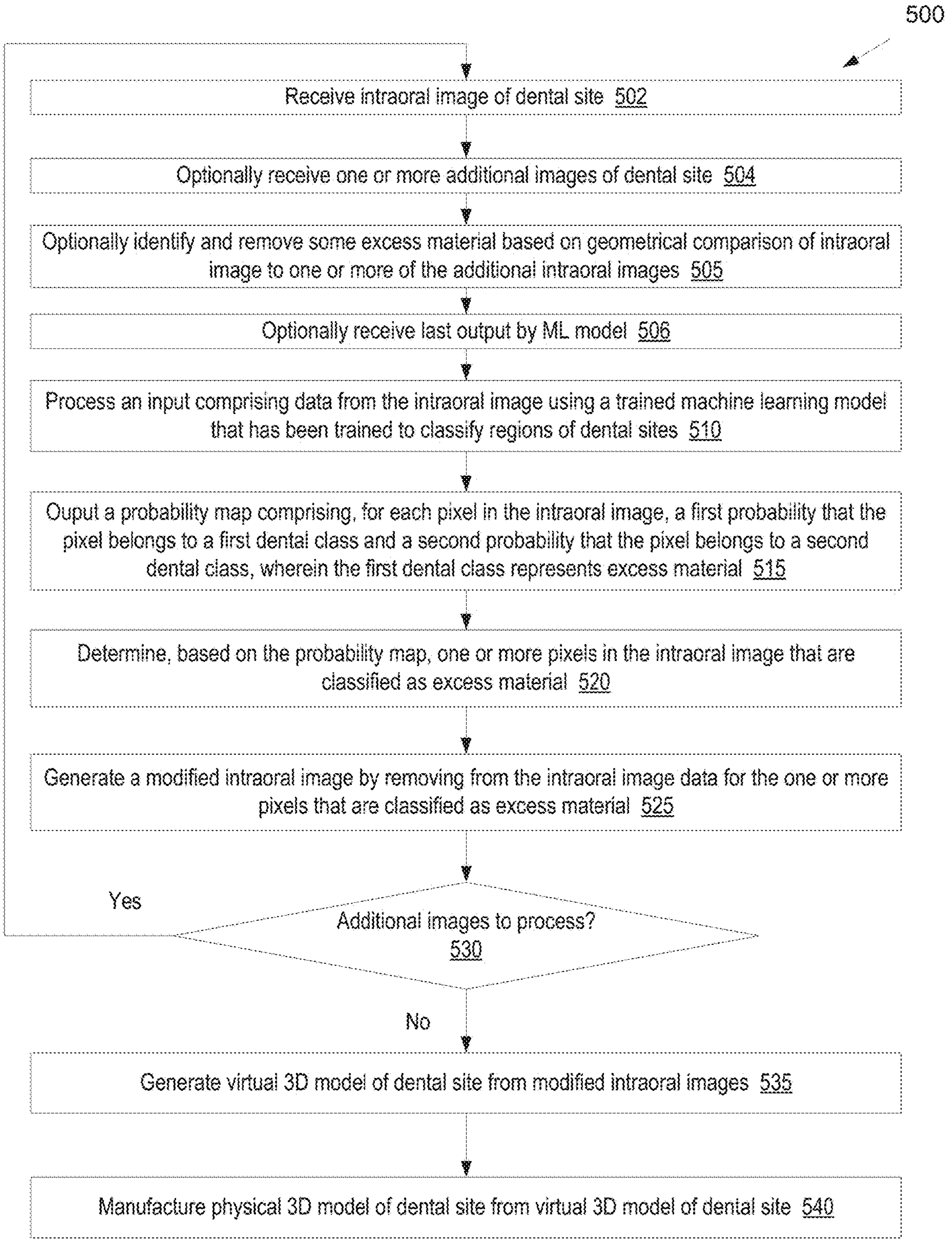
FIG. 5A illustrates a flow diagram for a method of classifying regions of an intraoral image using a trained machine learning model, in accordance with an embodiment.

FIG. 5A illustrates a flow diagram for a method 500 of classifying regions of an intraoral image using a trained machine learning model, in accordance with an embodiment. At block 502 of method 500, processing logic receives intraoral scan data (e.g., an intraoral image) of a dental site. In one embodiment, a blended scan (also referred to as a blended intraoral image) is received, where the blended scan is a combination of multiple discrete images. While scanning, the intraoral scanner may generate multiple (e.g., tens) of scans (e.g., height maps) per second (referred to as raw scans). In order to improve the quality of the data captured, a blending process may be used to combine a sequence of raw scans into a blended scan by some averaging process. Additionally, an intraoral scanner may generate many scans per second. This may be too much data to process using the machine learning model in real time. Accordingly, groups of similar scans may be combined into the blended scans, and the blended scans may be input into the machine learning model. This may vastly reduce the computation resources used to process the intraoral images without degrading quality. In one embodiment, each blended scan includes data from up to 20 raw scans, and further includes scans that differ by less than a threshold angular difference from one another and/or by less than a threshold positional difference from one another. Accordingly, some blended scans may include data from 20 scans, while other blended scans may include data from fewer than 20 scans. In one embodiment, the intraoral image (which may be a blended scan) includes height values and intensity values for each pixel in the image.

At block 504, processing logic optionally receives one or more additional images of the dental site. The additional image(s) may include a color image, an intraoral image generated under specific lighting conditions (e.g., UV or IR), one or more other intraoral images of the dental site, an image generated by projecting a 3D model of the dental site (which was generated from previously processed intraoral images) onto a 2D surface or plane of the intraoral image, and so on.

Sometimes a scan contains only a small part of the desired class (teeth, gums or excess material), which is hard to recognize. However, neighbor scans may contain a much bigger part of the same area and can support recognition. Two approaches can be used to incorporate neighbor scans in embodiments. One approach is to use an RNN (see block 506 below). Another approach is to use of multiple layers with neighbor scans (i.e. neighbor intraoral images). Embodiments may use several neighbor scans as additional layers and let the network extract additional information from them.

FIGS. 12A-D illustrate four neighboring scans (intraoral images) that may be combined to form an input to a trained machine learning model, in accordance with an embodiment.

In some embodiments, at block 505 processing logic compares the received intraoral image to one or more additional intraoral images received at block 504. The additional intraoral image(s) may have been generated prior to generation of the intraoral image received at block 502. Geometrical comparisons may be performed between the intraoral image and the additional intraoral image(s) to identify excess material and/or to remove the excess material. The intraoral image may be modified to remove the excess material before proceeding to block 506 or block 510 in some embodiments.

At block 506, processing logic optionally receives a last output by the machine learning model (e.g., if the machine learning model is an RNN).

At block 510, an input is provided to the machine learning model, and the machine learning model processes the input. The input may include data from the intraoral image as well as data from one or more of the additional images and/or the last output of the machine learning model. The machine learning model may have been trained to classify regions of dental sites into a discrete set of dental classes, as discussed above. The data that is input into the machine learning model may include a single layer (e.g., just height values from a single image) or multiple layers. If multiple layers are used, then one layer may include the height values from the image, and a second layer may include intensity values from the image. Additionally, or alternatively, additional layers may include three layers for color values (e.g., a separate layer for each color channel, such as an R layer, a G layer and a B layer), a layer for pixel information from an image generated under specific lighting conditions, and so on. In some embodiments, data from multiple images is input into the machine learning model together, where the multiple images may all be of the same dental site. For example, a first layer may include height values from a first image of a dental site, a second layer may include height values from a second image of the dental site, a third layer may include height values from a third image of the dental site, and so on. In some embodiments, an RNN is used. In such an embodiment, a second layer may include a previous output of the machine learning model (which resulted from processing a previous input).

At block 515, processing logic outputs a probability map comprising, for each pixel in the intraoral image, a first probability that the pixel belongs to a first dental class and a second probability that the pixel belongs to a second dental class. The first dental class may represent excess material, and the second dental class may represent something other than excess material (e.g., teeth and/or gums). In one embodiment, the probability map further provides, for each pixel, a third probability that the pixel belongs to a third dental class. For example, the second dental class may be teeth and the third dental class may be gums. In a further embodiment, the probability map may further provide, for each pixel, additional probabilities of the pixel belonging to one or more other dental classes described above.

At block 520, processing logic determines, based on the probability map, one or more pixels that are classified as excess material. In one embodiment, processing logic determines whether the probability of a pixel being excess material is larger than the probabilities of the pixel being anything else (e.g., larger than the probability of the pixel being gums or teeth). A pixel is then determined to be in the excess material class (e.g., represented as a blue component) if it has greater value than other dental classes (e.g., tooth and gum dental classes represented as red and green components, respectively). That is the simplest approach that operates directly on height maps of intraoral images, and may be performed in scan time (e.g., in real time or near real time as scans are generated).

In one embodiment, processing logic determines whether the probability of a pixel being excess material exceeds a threshold probability. If the probability of the excess material class (e.g., represented as a blue component) has a value that is greater than some probability threshold, then the pixel is classified as excess material. If the probability is lower than the probability threshold, then the pixel is not classified as excess material. This is another scan time approach, and has increased flexibility. The probability threshold can be adjusted so that too much area is not identified as excess material and removed.

Figure 8B:
FIG. 8B illustrates an example second modified virtual 3D model generated by removing points from the original virtual 3D model that are classified as excess material, where a second threshold is used to the identify points classified as excess material.
Figure 8A:
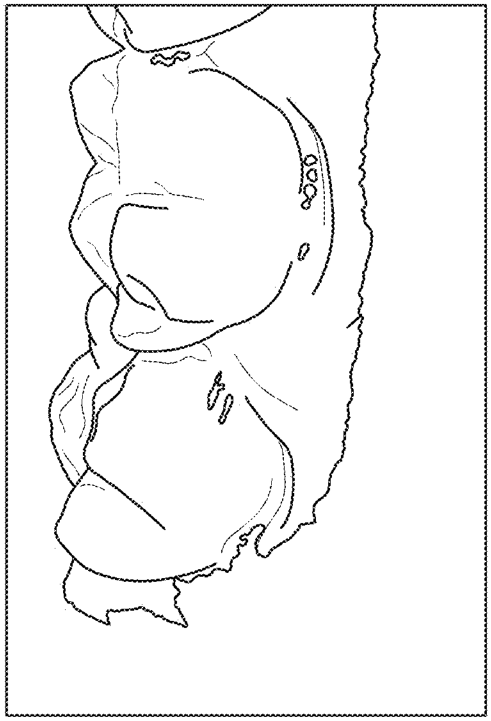
FIG. 8A illustrates an example first modified virtual 3D model generated by removing points from an original virtual 3D model that are classified as excess material, where a first threshold is used to identify points classified as excess material.
Figure 8C:
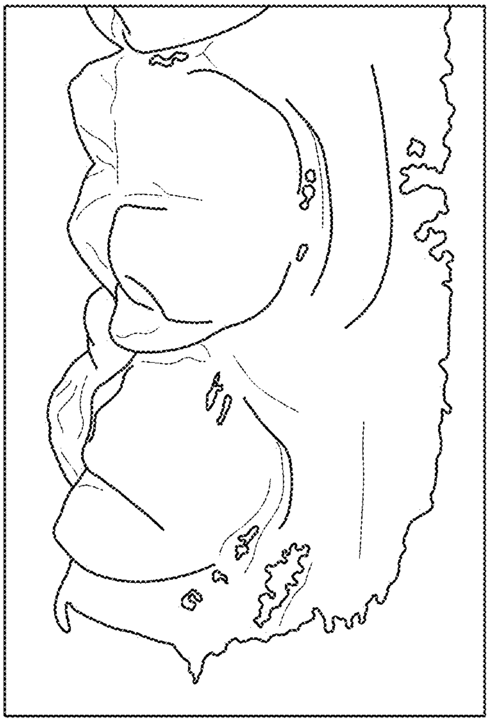
FIG. 8C illustrates an example third modified virtual 3D model generated by removing points from the original virtual 3D model that are classified as excess material, where a third threshold is used to identify the points classified as excess material.

FIG. 8A illustrates an example first modified virtual 3D model generated by removing points from an original virtual 3D model that are classified as excess material, where a first threshold is used to identify points classified as excess material. FIG. 8B illustrates an example second modified virtual 3D model generated by removing points from the original virtual 3D model that are classified as excess material, where a second threshold is used to the identify points classified as excess material. FIG. 8C illustrates an example third modified virtual 3D model generated by removing points from the original virtual 3D model that are classified as excess material, where a third threshold is used to identify the points classified as excess material.

Returning to FIG. 5A, at block 525 processing logic may generate a modified intraoral image by removing, filtering or hiding from/in the intraoral image data for the one or more pixels that are classified as excess material. This may be performed, for example, by adjusting height values for the pixel to indicate that no surface is present at that pixel.

At block 530, processing logic determines whether there are any additional images (scans) to process. If there are additional images to process, the method returns to block 502. The operations of blocks 502-525 may be performed for many different images produced during an intraoral scanning session, and may be performed during intraoral scanning (e.g., in real time or near real time). Accordingly, many different modified images may be generated. If there are no additional images to process (e.g., if an intraoral scanning session is complete), then the method proceeds to block 535.

At block 535, processing logic generates a virtual 3D model of the dental site from the modified intraoral images. The virtual 3D model may lack excess material, or the amount of excess material in the 3D model may be drastically reduced or hidden. At block 540, a physical 3D model of the dental site may be generated from the virtual 3D model of the dental site. For example, a digital file comprising the virtual 3D model may be sent to a manufacturer, which may then use a rapid prototyping machine or 3D printer along with the virtual 3D model to print the physical 3D model.

If some predictions were wrong and excess material was classified as teeth or gums, there will be leftovers. Such leftovers become a part of a resulting surface (e.g., of a virtual 3D model) and are not removed by other predictions, because a prediction is generated for the corresponding scan and does nothing with other scans in some embodiments. To address this problem a surface layer is introduced in embodiments. The surface layer may be an additional input with a height map of the surface under the current scan. This allows scanning the surface at a leftover location and getting pairs of height maps: one for current scan (most likely without any leftovers) and one for surface scan (with the leftover). The network may use both scans and detect leftovers on the surface, and may then remove such leftovers (i.e. residual excess material that was previously undetected).

Figure 5B:
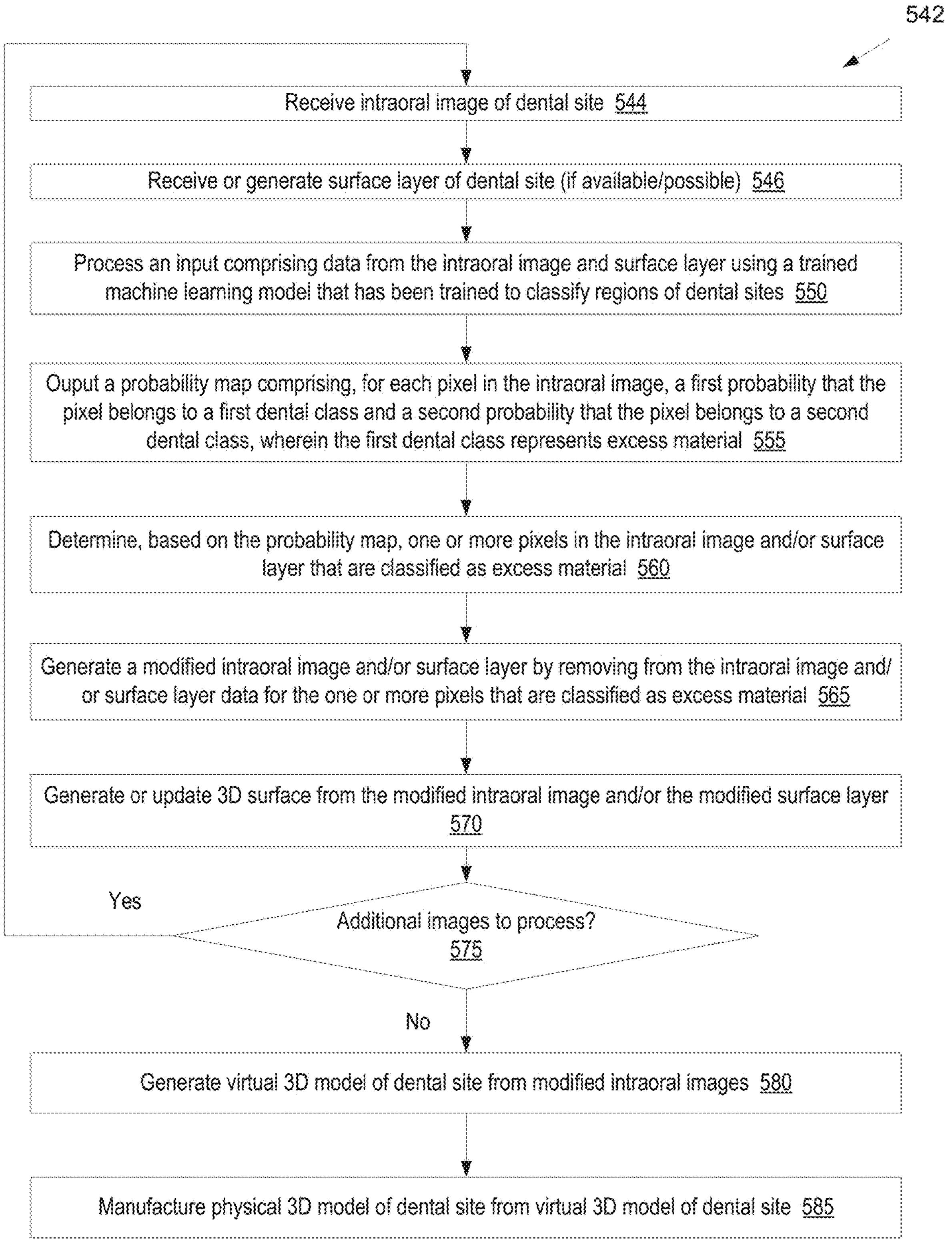
FIG. 5B illustrates a flow diagram for another method of classifying regions of an intraoral image using a trained machine learning model, in accordance with an embodiment.

FIG. 5B illustrates a flow diagram for a method 542 of classifying regions of an intraoral image using a trained machine learning model, in accordance with an embodiment. At block 544 of method 542, processing logic receives intraoral scan data (e.g., an intraoral image) of a dental site. Processing logic may optionally also receive any of the additional images previously discussed. At block 546, processing logic may receive a surface layer of the dental site if one is available or may generate a surface layer of the dental site if one can be generated. If the intraoral image is the very first intraoral image of the dental site, then no surface layer may yet be available. For example, as intraoral images are received and processed, those intraoral images (or modified versions thereof) may be stitched together to form a 3D surface. That 3D surface may be projected onto a 2D surface or plane (which may be on a same plane as the received intraoral image) to generate the surface layer.

At block 550, an input is provided to the machine learning model, and the machine learning model processes the input. The input may include data from the intraoral image as well as data from the surface layer. The input may additionally include one or more other layers in embodiments, as previously described.

At block 555, processing logic outputs a probability map comprising, for each pixel in the intraoral image and/or for each pixel in the surface layer, a first probability that the pixel belongs to a first dental class and a second probability that the pixel belongs to a second dental class. The first dental class may represent excess material, and the second dental class may represent something other than excess material (e.g., teeth and/or gums). In one embodiment, the probability map further provides, for each pixel, a third probability that the pixel belongs to a third dental class. For example, the second dental class may be teeth and the third dental class may be gums. In a further embodiment, the probability map may further provide, for each pixel, additional probabilities of the pixel belonging to one or more other dental classes described above.

At block 560, processing logic determines, based on the probability map, one or more pixels in the intraoral image and/or one or more pixels in the surface layer (surface height map) that are classified as excess material. At block 565 processing logic may generate a modified intraoral image by removing from the intraoral image data for the one or more pixels that are classified as excess material. This may be performed, for example, by adjusting height values for the pixel to indicate that no surface is present at that pixel. Thus, data for excess material may be filtered out of the image. Additionally, the surface layer may be adjusted by removing, filtering or hiding from the surface layer data for pixels that have been classified as excess material.

At block 570, processing logic may generate or update a 3D surface from the modified intraoral image and/or the modified surface layer. In one embodiment, the 3D surface is generated by stitching the modified intraoral image to one or more previously generated intraoral images. In one embodiment, a previously generated 3D surface is updated using the data from the modified intraoral image and/or the modified surface layer. This may cause one or more regions of the 3D surface that were previously classified as gums or teeth, for example, to be reclassified as excess material and removed from the 3D surface.

At block 575, processing logic determines whether there are any additional images (scans) to process. If there are additional images to process, the method returns to block 544. The operations of blocks 544-570 may be performed for many different images produced during an intraoral scanning session, and may be performed during intraoral scanning (e.g., in real time or near real time). Accordingly, many different modified images may be generated. If there are no additional images to process (e.g., if an intraoral scanning session is complete), then the method proceeds to block 580.

At block 580, processing logic generates a virtual 3D model of the dental site from the modified intraoral images and/or modified surface layers. The virtual 3D model may lack excess material, or the amount of excess material in the 3D model may be drastically reduced. At block 585, a physical 3D model of the dental site may be generated from the virtual 3D model of the dental site. For example, a digital file comprising the virtual 3D model may be sent to a manufacturer, which may then use a rapid prototyping machine or 3D printer along with the virtual 3D model to print the physical 3D model.

Figure 10A:
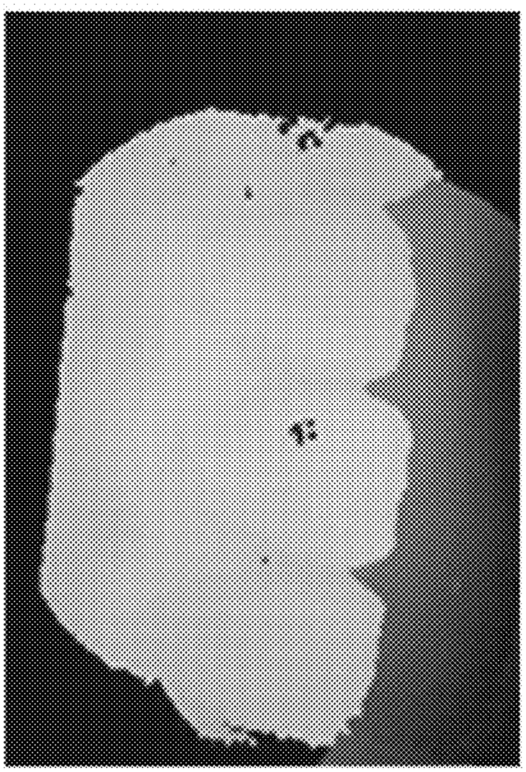
FIG. 10A illustrates an example intraoral image comprising a height map that has been modified to remove excess material.

FIG. 10A illustrates an example intraoral image comprising a height map that has been modified to remove excess material.

Figure 10B:
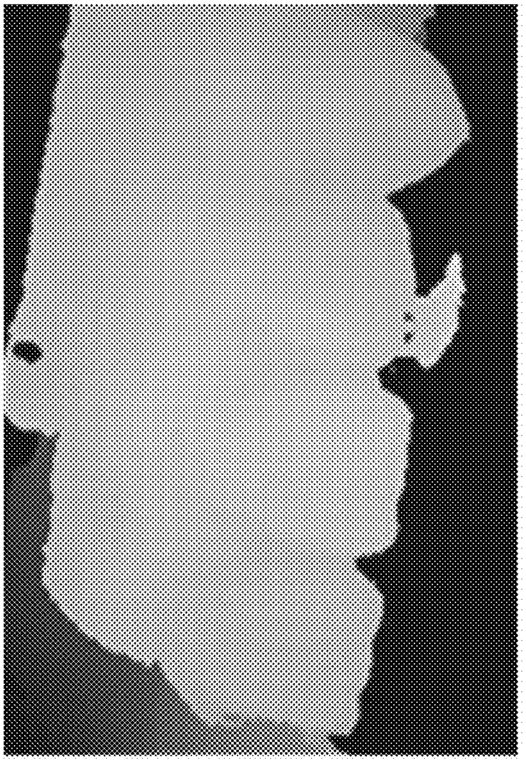
FIG. 10B illustrates an example surface height map generated from one or more intraoral images generated prior to the generation of the intraoral image of FIG. 10A, where the example surface height map includes excess material not previously identified.

FIG. 10B illustrates an example surface layer (i.e. a surface height map generated from one or more intraoral images generated prior to the generation of the intraoral image of FIG. 10A), where the example surface layer includes excess material not previously identified.

Figure 10C:
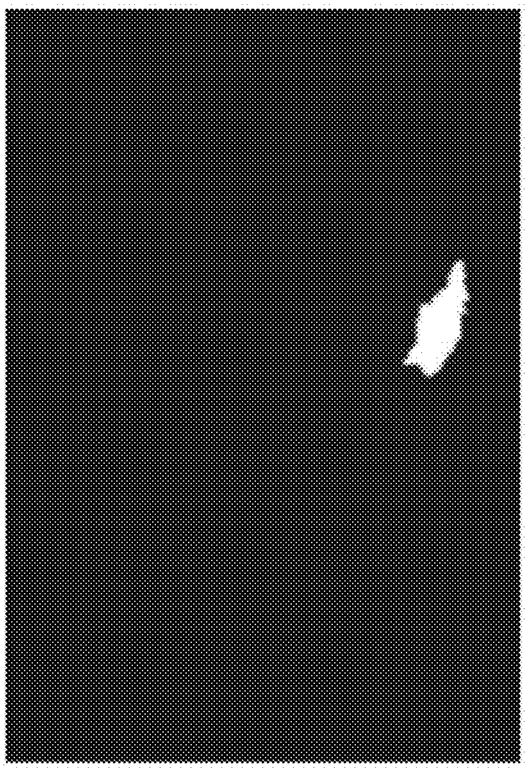
FIG. 10C illustrates a leftover prediction showing previously unidentified excess material from FIG. 10B.

FIG. 10C illustrates a leftover prediction showing previously unidentified excess material from FIG. 10B that may be identified at block 560 of method 500. Based on the identification of the residual excess material in the surface layer, the surface layer may be modified to remove this residual excess material.

Figure 6:
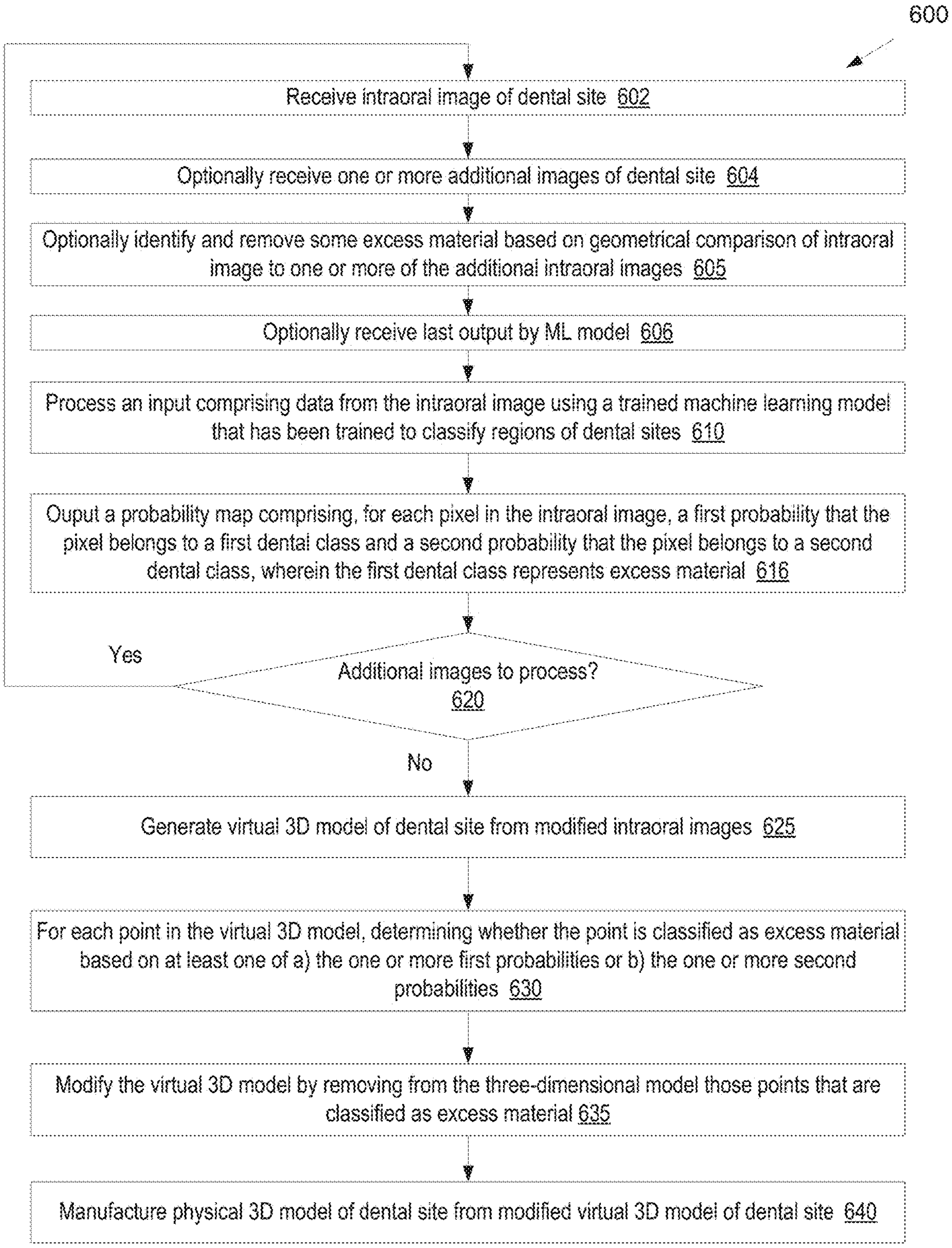
FIG. 6 illustrates a flow diagram for another method of classifying regions of an intraoral image using a trained machine learning model, in accordance with an embodiment.

FIG. 6 illustrates a flow diagram for another method 600 of classifying regions of an intraoral image using a trained machine learning model, in accordance with an embodiment. At block 602 of method 600, processing logic receives intraoral scan data (e.g., an intraoral image) of a dental site. At block 604, processing logic optionally receives one or more additional images of the dental site. The additional image(s) may include a color image, an intraoral image generated under specific lighting conditions (e.g., UV or IR), one or more other intraoral images of the dental site, an image generated by projecting a 3D model of the dental site (which was generated from previously processed intraoral images) onto a 2D surface or plane of the intraoral image, and so on.

In some embodiments, at block 605 processing logic compares the received intraoral image to one or more additional intraoral images received at block 604. The additional intraoral image(s) may have been generated prior to generation of the intraoral image received at block 602. Geometrical comparisons may be performed between the intraoral image and the additional intraoral image(s) to identify excess material and/or to remove the excess material. The intraoral image may be modified to remove the excess material before proceeding to block 606 or block 610 in some embodiments.

At block 606, processing logic optionally receives a last output by the machine learning model (e.g., if the machine learning model is an RNN).

At block 610, an input is provided to the machine learning model, and the machine learning model processes the input. The input may include data from the intraoral image as well as data from one or more of the additional images and/or the last output of the machine learning model. The machine learning model may have been trained to classify regions of dental sites into a discrete set of dental classes, as discussed above. The input may include a single layer or multiple layers are previously described.

At block 616, processing logic outputs a probability map comprising, for each pixel in the intraoral image, a first probability that the pixel belongs to a first dental class and a second probability that the pixel belongs to a second dental class. The first dental class may represent excess material, and the second dental class may represent something other than excess material (e.g., teeth and/or gums). In one embodiment, the probability map further provides, for each pixel, a third probability that the pixel belongs to a third dental class. For example, the second dental class may be teeth and the third dental class may be gums. In a further embodiment, the probability map may further provide, for each pixel, additional probabilities of the pixel belonging to one or more other dental classes described above.

At block 620, processing logic determines whether there are any additional images (scans) to process. If there are additional images to process, the method returns to block 602. The operations of blocks 602-616 may be performed for many different images produced during an intraoral scanning session, and may be performed during intraoral scanning (e.g., in real time or near real time). Accordingly, many different modified images may be generated. If there are no additional images to process (e.g., if an intraoral scanning session is complete), then the method proceeds to block 625.

At block 625, processing logic generates a virtual 3D model of the dental site from the intraoral images. Data from the probability maps associated with the intraoral images may be projected onto appropriate points of the 3D model. Accordingly, each point in the virtual 3D model may include at least one set of dental class probability values, and will likely include numerous sets of dental class probability values (one from each intraoral image with a pixel that maps to that point).

At block 630, for each point in the virtual 3D model, processing logic determines whether the point is classified as excess material based on at least one of a) one or more first probabilities (from the sets of probability values that map to that point) that the point belongs to a first dental class associated with excess material or b) one or more additional probabilities that the point belongs to other dental classes. In one embodiment, a determination is made for each set of probability values as to whether or not the point is excess material. For example, for each set of probability values associated with a point, the probability of the point being excess material may be compared to the probabilities of the point being other dental classes, and the set of probability values may determine that the point belongs to the excess material dental class if it has the highest probability. In another example, for each set of probability values associated with a point, the probability of the point being excess material may be compared to a threshold. That set of probability values may determine that the point belongs to the excess material dental class if the probability of the point being excess material meets or exceeds a probability threshold. Similarly, for each set of probability values associated with a point processing logic may determine whether the point is classified as a second dental class (e.g., teeth), as a third dental class (e.g., gums), and so on. Each such determination may count as a vote for a particular dental class. If a majority of sets of probability values associated with a point vote on that point being excess material, then the point is designated as excess material. Similarly, if a majority of sets of probability values associated with a point vote on that point being some other class, that point is designated as the other class.

At block 535, processing logic modifies the virtual 3D model by removing from the 3D model those points that are classified as excess material. In some embodiments, this includes filtering out the points without actually removing the points from the 3D model. Accordingly, a user may turn off the filtering to view the excess material. Processing logic may label each of the points on the virtual 3D model according to the dental class of the point. Different visualizations (e.g., different colors or hashing) may be used to show each of the dental classes. In one embodiment, the points with the excess material dental class are not shown, and points with other dental classes are shown with associated visualizations.

At block 640, a physical 3D model of the dental site may be generated from the virtual 3D model of the dental site. For example, a digital file comprising the virtual 3D model may be sent to a manufacturer, which may then use a rapid prototyping machine or 3D printer along with the virtual 3D model to print the physical 3D model.

Figure 7A:
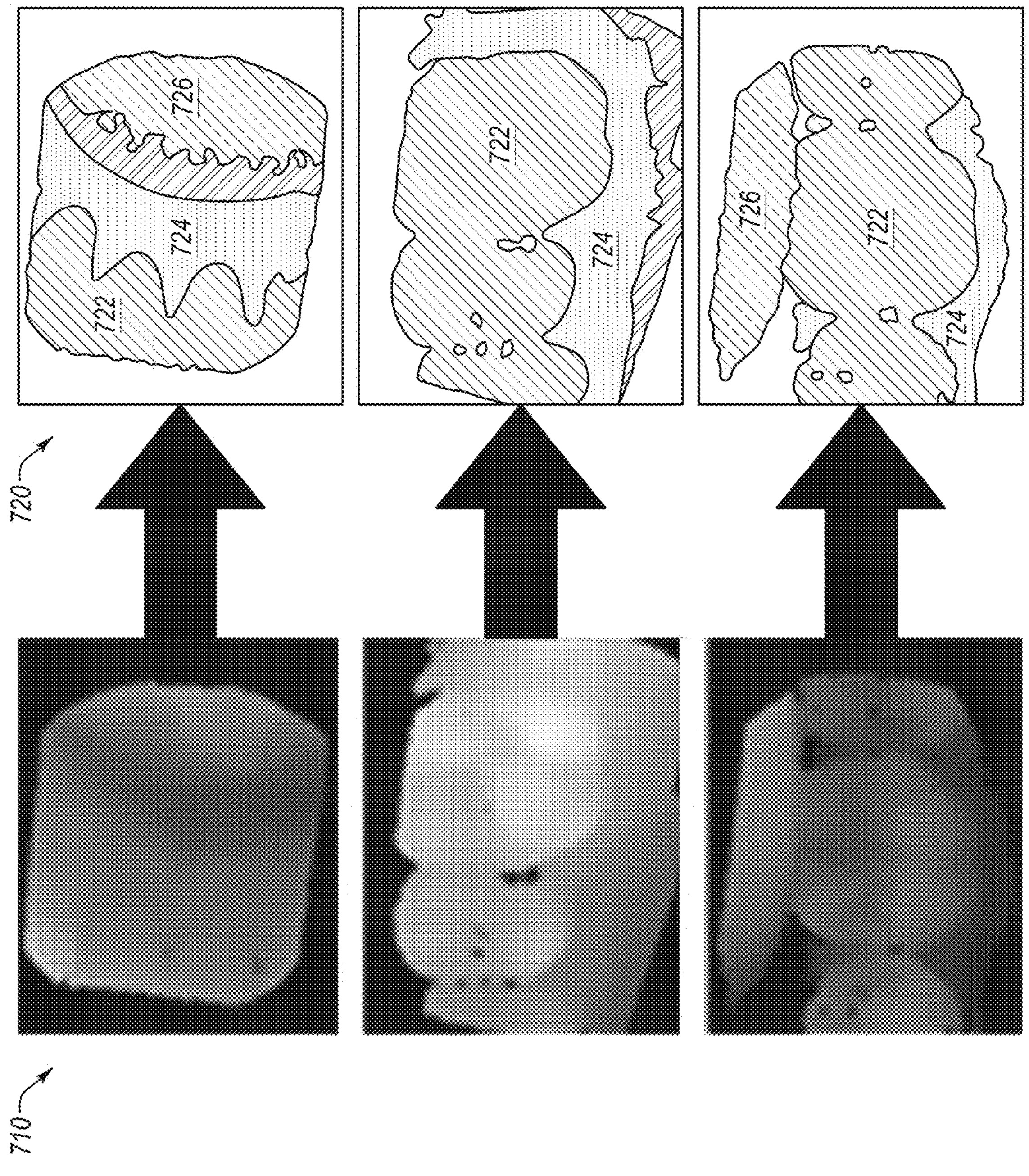
FIG. 7A illustrates a set of intraoral images of a dental site, and a corresponding set of probability maps output by a machine learning model, in accordance with an embodiment.

FIG. 7A illustrates a set of intraoral images of a dental site, and a corresponding set of probability maps output by a machine learning model, in accordance with an embodiment.

Figure 7B:
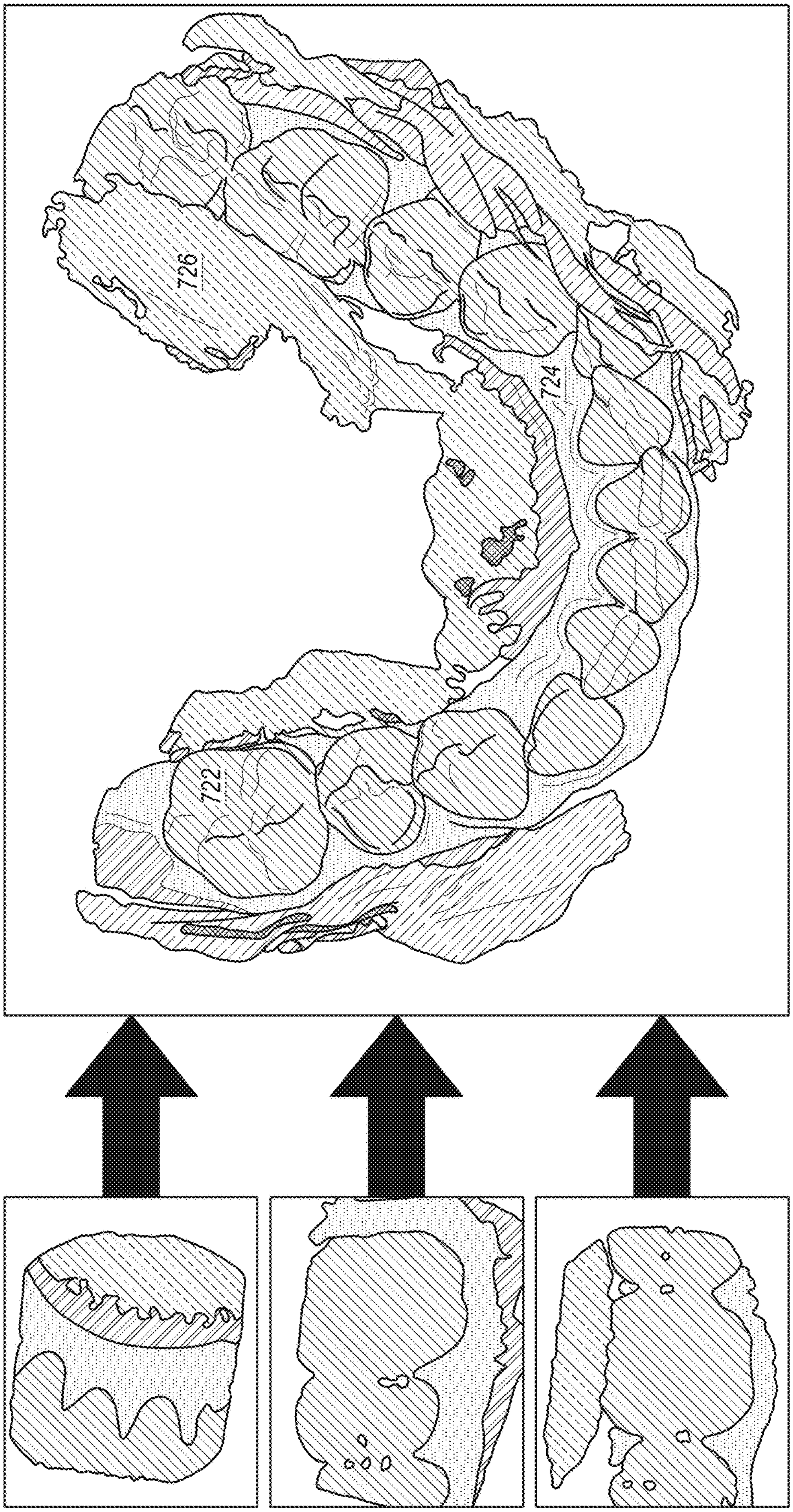
FIG. 7B illustrates a set of probability maps output by a machine learning model and a virtual 3D model generated from the set of probability maps and/or the set of intraoral images of FIG. 7A, in accordance with an embodiment.
Figure 7C:
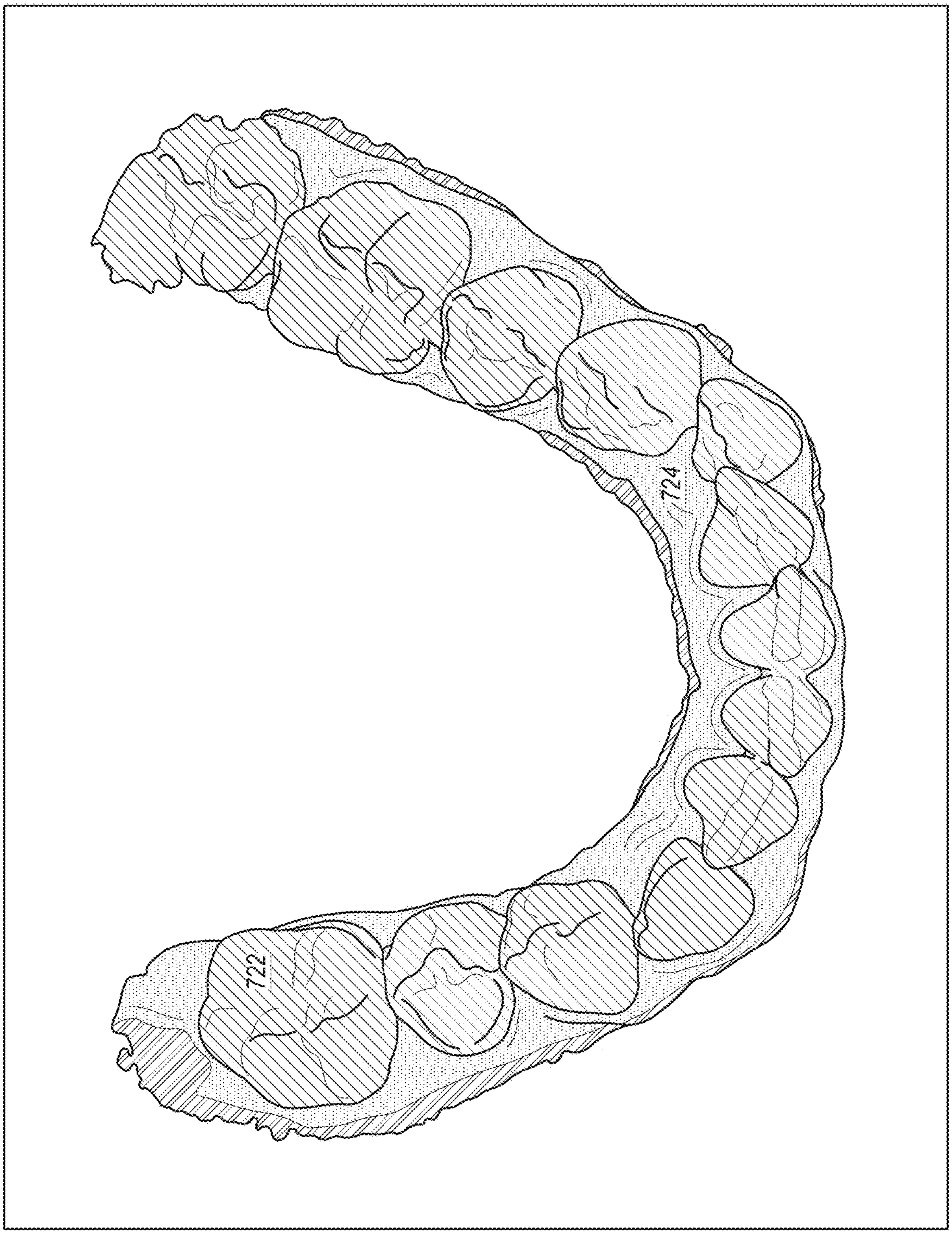
FIG. 7C illustrates a modified virtual 3D model in which excess material has been removed, in accordance with an embodiment.

FIG. 7B illustrates a set of probability maps output by a machine learning model and a virtual 3D model generated from the set of probability maps and/or the set of intraoral images of FIG. 7A, in accordance with an embodiment.

FIG. 7C illustrates a modified virtual 3D model in which excess material has been removed, in accordance with an embodiment.

Figure 13:
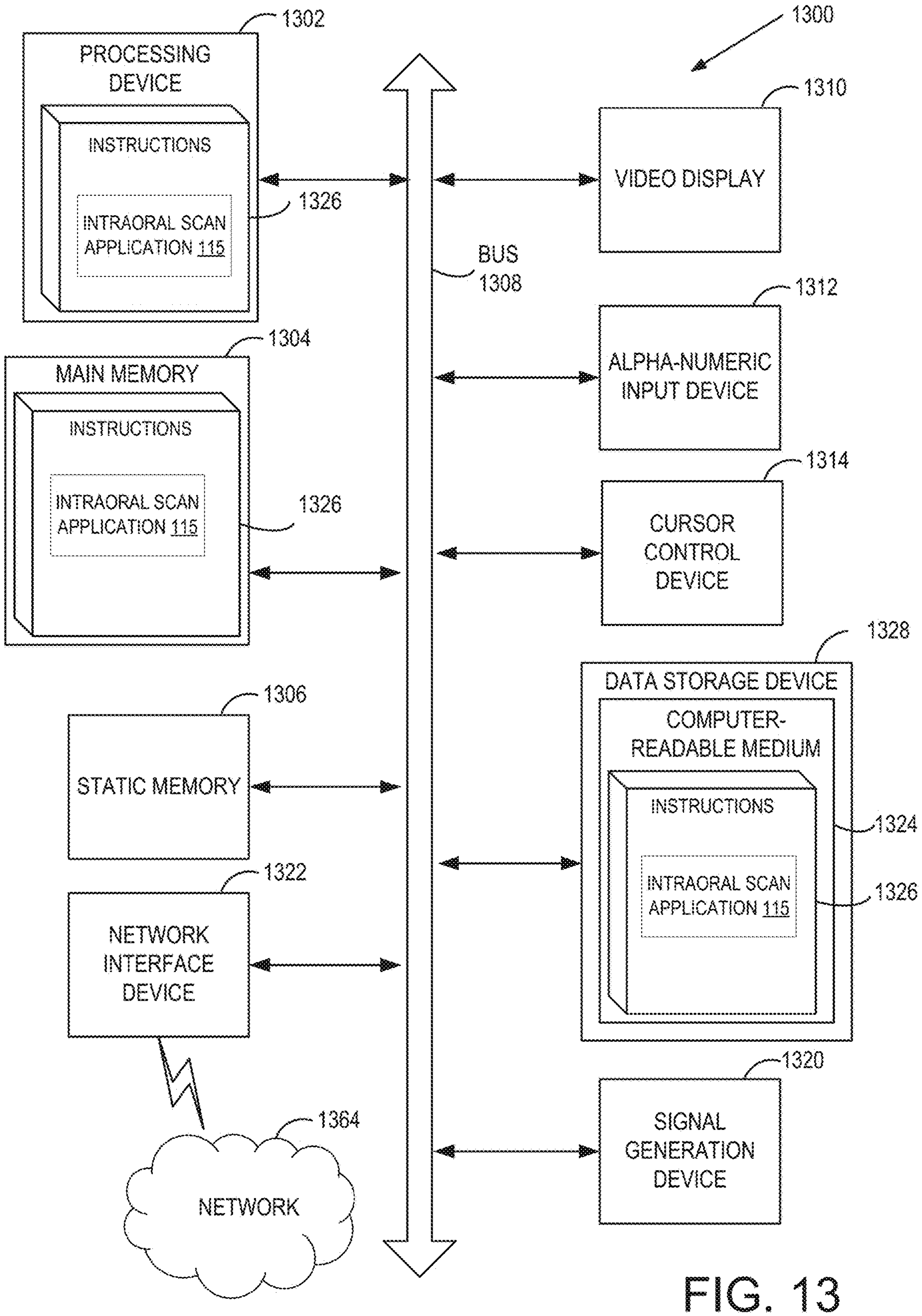
FIG. 13 illustrates a block diagram of an example computing device, in accordance with embodiments of the present disclosure.

FIG. 13 illustrates a diagrammatic representation of a machine in the example form of a computing device 1300 within which a set of instructions, for causing the machine to perform any one or more of the methodologies discussed above. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1300 includes a processing device 1302, a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1328), which communicate with each other via a bus 1308.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1302 is configured to execute the processing logic (instructions 1326) for performing operations and steps discussed herein.

The computing device 1300 may further include a network interface device 1322 for communicating with a network 1364. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

The data storage device 1328 may include a machine-readable storage medium (or more specifically a non-transitory computer-readable storage medium) 1324 on which is stored one or more sets of instructions 1326 embodying any one or more of the methodologies or functions described herein. A non-transitory storage medium refers to a storage medium other than a carrier wave. The instructions 1326 may also reside, completely or at least partially, within the main memory 1304 and/or within the processing device 1302 during execution thereof by the computer device 1300, the main memory 1304 and the processing device 1302 also constituting computer-readable storage media. The instructions 1326 may include instructions for an intraoral scan application 115 and/or an intraoral image classifying module 119, as discussed with reference to FIG. 1.

The computer-readable storage medium 1324 may also be used to store instructions to perform any of the operations described herein, such as one or more machine learning models trained to identify and/or remove flaps/excess material. The computer readable storage medium 1324 may also store a software library containing methods that perform the operations described above. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:

an intraoral scanner to generate a plurality of intraoral scans of a dental site; and a computing device comprising a processor and a memory, the computing device configured to:

receive the plurality of intraoral scans of the dental site;

process the plurality of intraoral scans using one or more trained machine learning models to classify points of the plurality of intraoral scans into a plurality of dental classes, wherein the points are classified into first points having a first dental class of the plurality of dental classes and second points having a second dental class of the plurality of dental classes;

output a user interface comprising one or more selectable controls corresponding to the plurality of dental classes and configured to enable a user to select, via the one or more selectable controls, one or more dental classes from among the plurality of dental classes identified in the intraoral scans by the one or more trained machine learning models;

receive a user input to exclude the first dental class and to include the second dental class;

generate a virtual three-dimensional (3D) model of at least a portion of the dental site based on stitching together the plurality of intraoral scans, wherein the virtual 3D model is generated based on stitching together the plurality of intraoral scans using the second points of the plurality of intraoral scans having the second dental class and without using the first points of the plurality of intraoral scans having the first dental class, and wherein, with respect to the first dental class and the second dental class, the virtual 3D model is generated to include only the second dental class and to exclude the first dental class; and output a view of the virtual 3D model in the user interface, wherein the first points having the first dental class are not included in the view of the virtual 3D model.

2. The system of claim 1, wherein the first dental class is an excess material dental class, wherein excess material comprises material other than teeth or gingiva.

3. The system of claim 1, wherein the plurality of intraoral scans are received from the intraoral scanner during an intraoral scanning session, and wherein the computing device is to process a first intraoral scan of the plurality of intraoral scans during the intraoral scanning session while another intraoral scan of the plurality of intraoral scans is generated by the intraoral scanner.

4. The system of claim 1, wherein at least one intraoral scan of the plurality of intraoral scans is a blended scan comprising data from a sequence of raw intraoral scans, wherein the computing device is further configured to:

combine the data from the sequence of raw intraoral scans to generate the blended scan.

5. The system of claim 1, wherein the one or more trained machine learning models are configured to generate an output comprising, for each point in each intraoral scan of the plurality of intraoral scans, an indication as to whether the point belongs to the first dental class or the second dental class.

6. The system of claim 1, wherein the computing device is further configured to:

receive a plurality of color images of the dental site, wherein each color image of the plurality of color images is associated with one or more intraoral scans of the plurality of intraoral scans, wherein the color images are further used to classify the points of the plurality of intraoral scans into the first points having the first dental class and the second points having the second dental class.

7. The system of claim 6, wherein the computing device is further configured to:

determine, for an intraoral scan of the plurality of intraoral scans, an alignment between the intraoral scan and an associated color image.

8. The system of claim 1, wherein the one or more trained machine learning models comprise a recurrent neural network, and wherein an input to the recurrent neural network comprises data for an intraoral scan of the plurality of intraoral scans and a previous output of the recurrent neural network associated with a previous intraoral scan of the plurality of intraoral scans that was generated prior to the intraoral scan.

9. The system of claim 1, wherein each point in an intraoral scan of the plurality of intraoral scans comprises a first value representing height and a second value representing intensity.

10. The system of claim 1, wherein for each intraoral scan of the plurality of intraoral scans the one or more trained machine learning models are to output a probability map comprising, for each point, a first probability that the point belongs to the first dental class, and a second probability that the point belongs to the second dental class.

11. The system of claim 10, wherein the probability map further comprises, for each point in the intraoral scan, a third probability that the point belongs to a third dental class of the plurality of dental classes, wherein the first dental class represents excess material, wherein the second dental class represents teeth, and wherein the third dental class represents gums.

12. The system of claim 11, wherein:

the probability map comprises an RGB image;

R values of the RGB image are associated with a first one of the first dental class, the second dental class or the third dental class;

G values in the RGB image are associated with a second one of the first dental class, the second dental class or the third dental class; and B values in the RGB image are associated with a third one of the first dental class, the second dental class or the third dental class.

13. The system of claim 11, further comprising:

a display to display the virtual 3D model, wherein the second dental class is displayed using a first visualization and the third dental class is displayed using a second visualization.

14. The system of claim 10, wherein the first dental class comprises an excess material dental class, and wherein the computing device is further configured to:

determine that a point is classified as excess material based on determining that the first probability that the point belongs to the first dental class that represents excess material exceeds a probability threshold.

15. The system of claim 10, wherein the first dental class comprises an excess material dental class, and wherein the computing device is further configured to:

determine that a point is classified as excess material based on determining that the first probability that the point belongs to the first dental class that represents excess material exceeds the second probability that the point belongs to the second dental class.

16. The system of claim 10, wherein the probability map further comprises, for each point in the intraoral scan, a third probability that the point belongs to a third dental class of the plurality of dental classes, and a fourth probability that the point belongs to a fourth dental class of the plurality of dental classes, wherein the first dental class represents excess material not adjacent to teeth, wherein the second dental class represents teeth, wherein the third dental class represents gums, and wherein the fourth dental class represents excess material adjacent to teeth.

17. The system of claim 10, wherein the probability map further comprises, for each point in the intraoral scan, a third probability that the point belongs to a third dental class of the plurality of dental classes, and a fourth probability that the point belongs to a fourth dental class of the plurality of dental classes, wherein the first dental class represents excess material, wherein the second dental class represents teeth, wherein the third dental class represents gums, and wherein the fourth dental class represents one of an upper palate, a gingival line, a scan body, a finger, or a preparation tooth.

18. The system of claim 1, wherein the computing device is further configured to:

adjust one or more parameters used to determine what data to remove from the virtual 3D model; and update the virtual 3D model by changing what data is removed from the virtual 3D model based on the one or more parameters.

19. The system of claim 18, wherein the one or more parameters comprise one or more probability thresholds that control which points of the virtual 3D model are classified as having the first dental class.

20. A non-transitory computer readable medium comprising instructions that, when executed by a processing device, cause the processing device to perform operations comprising:

receiving a plurality of intraoral scans of a dental site;

processing the plurality of intraoral scans using one or more trained machine learning models to classify points of the plurality of intraoral scans into a plurality of dental classes, wherein the points are classified into first points having a first dental class of the plurality of dental classes and second points having a second dental class of the plurality of dental classes;

outputting a user interface comprising one or more selectable controls corresponding to the plurality of dental classes and configured to enable a user to select, via the one or more selectable controls, one or more dental classes from among the plurality of dental classes identified in the intraoral scans by the one or more trained machine learning models;

receiving a user input to exclude the first dental class and to include the second dental class;

generating a virtual three-dimensional (3D) model of at least a portion of the dental site based on stitching together the plurality of intraoral scans, wherein the virtual 3D model is generated based on stitching together the plurality of intraoral scans using the second points of the plurality of intraoral scans having the second dental class and without using the first points of the plurality of intraoral scans having the first dental class, and wherein the virtual 3D model is generated to include only the second dental class and to exclude the first dental class; and outputting a view of the virtual 3D model in the user interface, wherein the first points having the first dental class are not included in the view of the virtual 3D model.

21. A method comprising:

receiving a plurality of intraoral scans of a dental site;

processing the plurality of intraoral scans using one or more trained machine learning models to classify points of the plurality of intraoral scans into a plurality of dental classes, wherein the points are classified into first points having a first dental class of the plurality of dental classes and second points having a second dental class of the plurality of dental classes;

outputting a user interface comprising one or more selectable controls corresponding to the plurality of dental classes and configured to enable a user to select, via the one or more selectable controls, one or more dental classes from among the plurality of dental classes identified in the intraoral scans by the one or more trained machine learning models;

receiving a user input to exclude the first dental class and to include the second dental class;

generating a virtual three-dimensional (3D) model of at least a portion of the dental site based on stitching together the plurality of intraoral scans, wherein the virtual 3D model is generated based on stitching together the plurality of intraoral scans using the second points of the plurality of intraoral scans having the second dental class and without using the first points of the plurality of intraoral scans having the first dental class, and wherein the virtual 3D model is generated to include only the second dental class and to exclude the first dental class; and outputting a view of the virtual 3D model in the user interface, wherein the first points having the first dental class are not included in the view of the virtual 3D model.

* * * * *